United States Patent [19]

Uzawa

[11] Patent Number: 5,798,872
[45] Date of Patent: Aug. 25, 1998

[54] ZOOM LENS SYSTEM

[75] Inventor: Tsutomu Uzawa, Hidaka, Japan

[73] Assignee: Olympus Optical Co., Ltd., Tokyo, Japan

[21] Appl. No.: 701,883

[22] Filed: Aug. 23, 1996

[30] Foreign Application Priority Data

Aug. 24, 1995 [JP] Japan ................................. 7-237849

[51] Int. Cl.$^6$ ................................................. G02B 15/14
[52] U.S. Cl. .......................... 359/686; 359/687; 359/688
[58] Field of Search ........................... 359/686, 687, 359/688, 715, 747, 753, 771, 774, 775

[56] References Cited

U.S. PATENT DOCUMENTS

| | | | |
|---|---|---|---|
| 4,629,294 | 12/1986 | Tanaka et al. | 359/686 |
| 5,221,994 | 6/1993 | Nishio | 359/684 |
| 5,249,079 | 9/1993 | Umeda | 359/554 |
| 5,285,316 | 2/1994 | Miyano et al. | 359/676 |
| 5,353,157 | 10/1994 | Horiuchi | 359/676 |
| 5,528,423 | 6/1996 | Arimoto et al. | 359/686 |
| 5,568,323 | 10/1996 | Sensui | 359/689 |
| 5,583,699 | 12/1996 | Nakayama | 359/687 |
| 5,612,825 | 3/1997 | Horiuchi et al. | 359/687 |
| 5,638,216 | 6/1997 | Horiuchi et al. | 359/683 |

FOREIGN PATENT DOCUMENTS 62-178917  8/1987  Japan.

OTHER PUBLICATIONS

English abstract of Ono Japanese laid open appliction No. 3-237725, Sep. 1991.
English abstract of Uzawa Japanese laid open application No. 3-297060, Nov. 1991.

*Primary Examiner*—Frank G. Font
*Assistant Examiner*—Michael P. Stafira
*Attorney, Agent, or Firm*—Cushman Darby & Cushman IP Group of Pillsbury Madison & Sutro LLP

[57] ABSTRACT

A zoom lens system composed, in order from the object side, of a first lens unit having a positive refractive power, a second lens unit having a negative refractive power, a third lens unit having a positive or negative refractive power and a fourth lens unit having a positive refractive power; and configured to change a magnification thereof by moving the second lens unit and moving the fourth lens unit monotonously toward the object side from its location at a wide position to a tele position. A ratio of a focal length of the first lens unit relative to that of the fourth lens unit is defined within a specific range and a magnification of the fourth lens unit at the tele position is specified within a definite range.

44 Claims, 6 Drawing Sheets

2

$$0 < f_4/f_1 < 0.45 \quad (1)$$

$$-1.6 < \beta_{4T} < -0.5 \quad (2)$$

wherein the reference symbol $f_1$ represents a focal length of the first lens unit, the reference symbol $f_4$ designates a focal length of the fourth lens unit and the reference symbol $\beta_{4T}$ denotes a focal length of the fourth lens unit at the tele position.

DETAILED DESCRIPTION OF THE PREFERRED EMBODIMENTS

Figure 1:
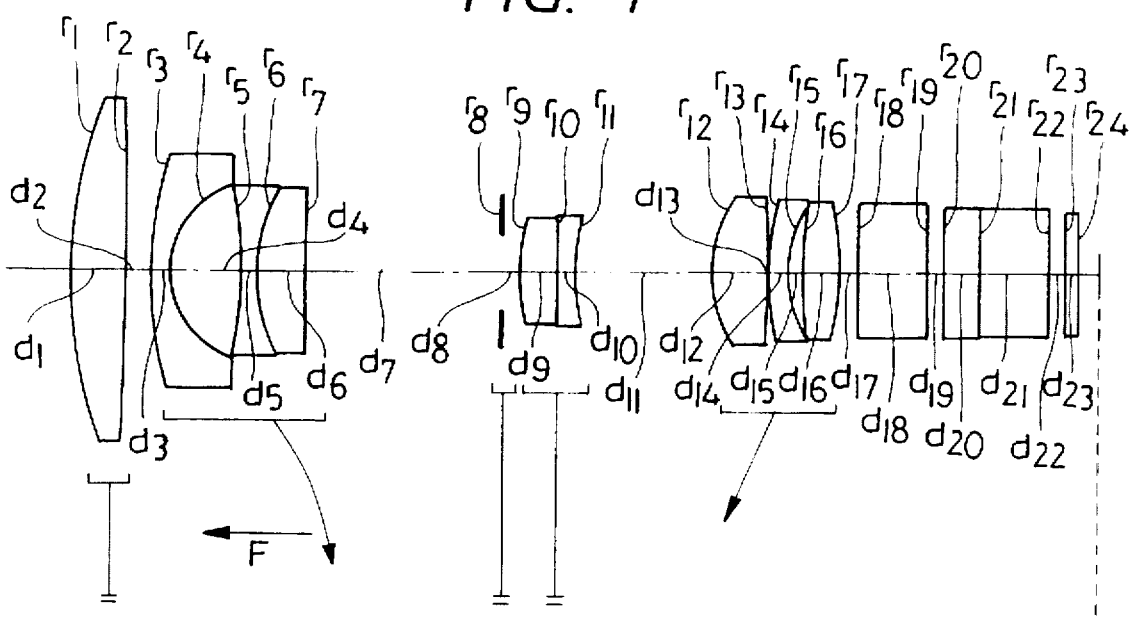
FIG. 1 through FIG. 10 show sectional views illustrating first through tenth embodiments respectively of the zoom lens system according to the present invention.
Figure 1:
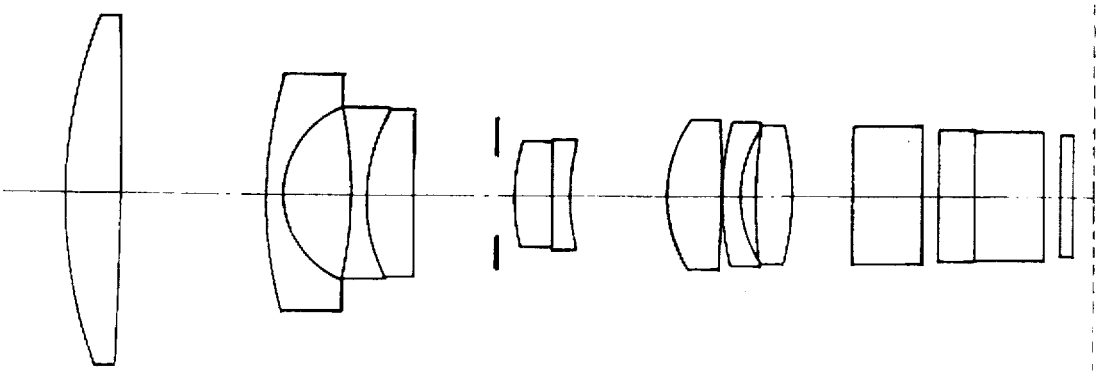
Figure 1:
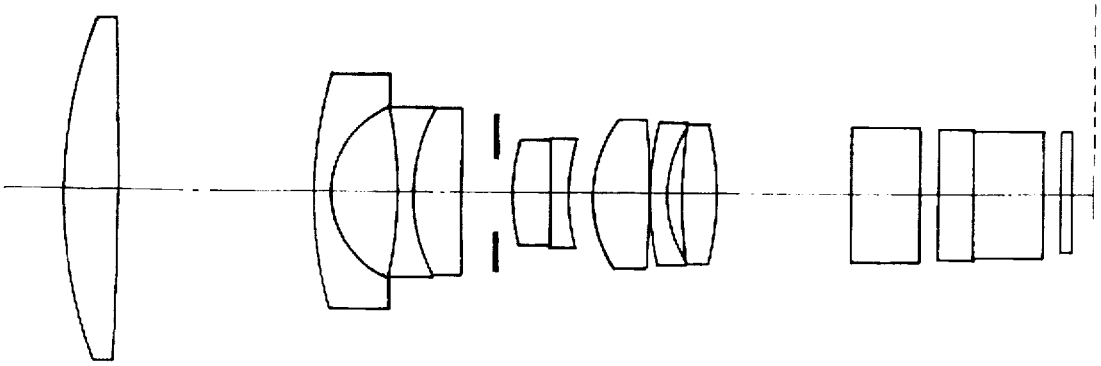
Figure 2:
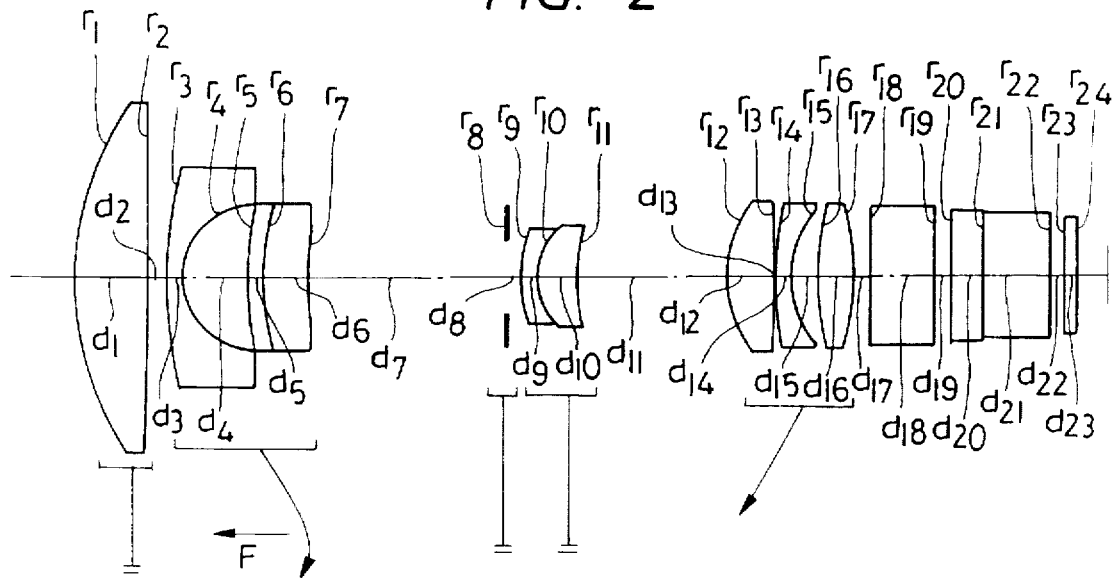

The zoom lens system according to the present invention is composed, in order from the object side, of a first lens unit having a positive refractive power, a second lens unit having a negative refractive power, a third lens unit having a positive or negative refractive power and a fourth lens unit having a positive refractive power. This zoom lens system is characterized in that its magnification is changed by moving the second lens unit and moving the fourth lens unit monotonously from its location at a wide position to its location at a tele position and that the zoom lens system satisfies the conditions (1) and (2) mentioned above.

In the zoom lens system according to the present invention, a main vari-focal function is assigned to the fourth lens unit which is moved monotonously toward the object side from its location at the wide position to its location at the tele position. Accordingly, the second lens unit can have a lessened vari-focal function and the first lens unit can have a weakened refractive power so as to widen a field angle of the zoom lens system. Further, the fourth lens unit has a refractive power sufficiently stronger than that of the first lens unit and inadequate imaging magnification so that the fourth lens unit efficiently exhibits its vari-focal function.

The condition (1) defines a ratio of the refractive power of the fourth lens unit relative to that of the first lens unit. If the upper limit of 0.45 of the condition (1) is exceeded, offaxial rays will be high on the first lens unit and this lens unit must be large thereby making it difficult to widen the field angle of the zoom lens system. If the lower limit of 0 of the condition (1) is not reached, the second lens unit cannot exhibit its varifocal function efficiently, thereby prolonging a total length of the zoom lens system.

The condition (2) defines a magnification of the second lens unit at the tele position. If the upper limit of −0.5 of the condition (2) is exceeded, the fourth lens unit cannot exhibit its vari-focal function efficiently, thereby prolonging the total length of the zoom lens system. If the lower limit of −1.6 of the condition (2) is not reached, the first through third lens units will have an excessively strong total refractive power, thereby making it difficult to widen the field angle of the zoom lens system.

The second lens unit and the fourth lens unit are capable of exhibiting their vari-focal functions efficiently in the zoom lens system according to the present invention as described above. Accordingly, the first lens unit and the third lens unit can be kept stationary for changing a magnification, thereby providing an advantage from a viewpoint of simplification of a lens moving mechanism.

When a zoom lens system which has a wide field angle like that according to the present invention uses a small image pickup device, in particular, the lens system has a large depth of field and requires no focusing for photographing in the ordinary mode. When the lens system is to be used for photographing at object located at a short distance, however, it is required to focus the lens system.

For the zoom lens system according to the present invention, it is desirable to focus it by moving the second lens unit along an optical axis. The second lens unit has an imaging magnification which has a relatively small absolute value in the zoom lens system according to the present invention and is suited as a lens system to be moved for focusing. Further, since a location of the second lens unit at the tele position is selected on the image side of its location at the wide position, a sufficient space is available at the tele position to move this lens unit for focusing the zoom lens system and it is proper to move the second lens unit for photographing an object located at a short distance with the zoom lens system. When the second lens unit is to be moved for focusing the zoom lens system, it is desirable to configure the lens unit so as to satisfy the following condition (3):

$$-0.6 < \beta_{2T} < 0 \tag{3}$$

wherein the reference symbol $\beta_{2T}$ represents a magnification of the second lens unit at the tele position.

If the lower limit of −0.6 of the condition (3) is not reached, the second lens unit must undesirably be moved for a long distance for focusing the zoom lens system. If the upper limit of 0 of the condition (3) is exceeded, in contrast, the second lens unit cannot exhibit its varifocal function efficiently, thereby prolonging the total length of the zoom lens system.

Then, it is desirable to fix a stop on the optical axis at any location between the second lens unit and the fourth lens unit. A location of the stop is important for configuring a wide-angle zoom lens system so that it has a simple composition and is compatible with a simple lens barrel. When a stop is disposed nearly at a center of an optical system for widening a field angle thereof, it produces an advantage for configuring compact lens units, or the first lens unit and the fourth lens unit in case of the zoom lens system according to the present invention. Accordingly, it is desirable to dispose a stop at any location between the second lens unit and the fourth lens unit in the zoom lens system according to the present invention, and a lens barrel to be adopted for the zoom lens system is not complicated when the stop is fixed on the optical system.

For configuring the zoom lens system according to the present invention compactly, it is desirable to configure the second lens unit and the fourth lens unit so as to satisfy the following condition (4):

$$1.2 \times \beta_{2T}/\beta_{2W} < \beta_{4T}/\beta_{4W} < 5.6 \times \beta_{2T}/\beta_{2W} \tag{4}$$

wherein the reference symbol $\beta_{2W}$ represents a magnification of the second lens unit at the wide position, the reference symbol $\beta_{2T}$ designates a magnification of the second lens unit at the tele position, the reference symbol $\beta_{4W}$ denotes a magnification of the fourth lens unit at the wide position and the reference symbol $\beta_{4T}$ represents a magnification of the fourth lens unit at the tele position.

The condition (4) defines shares of the vari-focal function between the second lens unit and the fourth lens unit. If the lower limit of the condition (4) is not reached, the second lens unit will have a large share of the varifocal function and offaxial rays will be high on the first lens unit at the wide position, whereby the first lens unit will be enlarged. If the upper limit of the condition (4) is exceeded, the offaxial rays will be high on the fourth lens unit, whereby the fourth lens unit will have a large diameter.

For configuring the zoom lens system compactly while maintaining favorable optical performance thereof, it is desirable to configure it so as to satisfy the following conditions (5), (6) and (7):

$$0 < f_W/f_1 < 0.2 \tag{5}$$

$$0.2 < f_W/f_4 < 0.7 \tag{6}$$

$$-0.2 < f_4/f_3 < 0.6 \tag{7}$$

wherein the reference symbol $f_W$ represents a focal length of the zoom lens system as a whole at the wide position, the reference symbol $f_1$ denote a focal length of the first lens unit, the reference symbol $f_4$ designates a focal length of the fourth lens unit and the reference symbol $f_3$ represents focal length of the third lens unit.

The condition (5) defines a focal length of the first lens unit. If the upper limit of 0.2 of the condition (5) is exceeded, the first lens unit will be enlarged, thereby producing a disadvantage for widening the field angle of the zoom lens system. If the first lens unit has a focal length below the lower limit of 0 of the condition (5), it will be disadvantageous for correcting negative distortion at the wide position.

The condition (6) defines a focal length of the fourth lens unit. If the upper limit of 0.7 of the condition (6) is exceeded, aberrations will be varied remarkably by changing a magnification. If the lower limit of 0.2 of the condition (6) is not reached, the fourth lens unit must be moved for a long distance, thereby prolonging the total length of the zoom lens system.

The condition (7) defines a ratio between focal lengths of the third lens unit and the fourth lens unit. If $f_4/f_3$ has a value exceeding the upper limit of 0.6 of the condition (7), it will be disadvantageous for reserving a required back focal length or disposing optical filters and other optical elements. If the ratio has a value below the lower limit of −0.2 of the condition (7), the offaxial rays will be high on the fourth lens unit, thereby producing a disadvantage for configuring the zoom lens system so as to have a large aperture.

When an aspherical surface is to be adopted for the fourth lens unit of the zoom lens system according to the present invention, it is desirable to configure the fourth lens unit dependently on locations of the aspherical surface as described below:

When the fourth lens unit is to be composed, in order from the object side, of a positive lens element, a negative meniscus lens element having a convex surface on the object side and a positive lens element, and an aspherical surface is to be used on the positive lens element disposed on the object side,it is desirable to configure the negative meniscus lens element so as to satisfy the following condition (8):

$$1.1 < (r_{F1} + r_{R1})/(r_{F1} - r_{R1}) < 4.0 \tag{8}$$

wherein the reference symbol $r_{F1}$ represents a radius of curvature on an object side surface of the negative meniscus lens element disposed in the fourth lens unit and the reference symbol $r_{R1}$ designates a radius of curvature on an image side surface of the negative meniscus lens element disposed in the fourth lens unit.

When an aspherical surface is to be used on the positive lens element disposed on the object side in the fourth lens unit as described above, mainly spherical aberration can be corrected with the aspherical surface and it is therefore preferable to configure the negative lens element as a meniscus lens element which has a convex surface on the object side and is advantageous for correcting offaxial aberrations such as astigmatism. In this case, the fourth lens unit can have a simple composition consisting of three lens elements. If the lower limit of 1.1 of the condition (8) is exceeded, the offaxial aberrations will be undercorrected. If the upper limit of 4.0 of the condition (8) is exceeded, the offaxial aberrations will be overcorrected.

When an aspherical surface is to be adopted for the positive lens element disposed on the image side in the fourth lens unit, on the other hand, it is desirable to configure the fourth lens unit as described below. Speaking concretely, it is desirable that the fourth lens unit is composed, in order from the object side, of a positive lens element, a negative biconcave lens element and a positive lens element, that the positive lens element disposed on the image side comprises an aspherical surface and that the negative lens element is configured so as to satisfy the following condition (9):

$$-0.9 < (r_{F2} + r_{R2})/(r_{F2} - r_{R2}) < 0.9 \qquad (9)$$

wherein the reference symbol $r_{F2}$ represents a radius of curvature on an object side surface of the negative lens element disposed in the fourth lens unit and the reference symbol $r_{R2}$ designates a radius of curvature on an image side surface of the negative lens element disposed in the fourth lens unit.

When an aspherical surface is used on the positive lens element disposed on the image side in the fourth lens unit as described above, the aspherical surface enhances an effect for correcting the offaxial aberrations such as astigmatism and it is therefore preferable to configure the negative lens element so as to have a biconcave shape which is the most advantageous for correcting also spherical aberration. In this case also, the fourth lens unit can have a simple composition consisting of three lens elements. If the lower limit of −0.9 of the condition (9) is not reached, the offaxial aberrations will be undercorrected. If the upper limit of 0.9 of the condition (9) is exceeded, the offaxial aberrations will be overcorrected.

Though description has been made above of compositions wherein an aspherical surface is to be used in the fourth lens unit, it is possible, needless to say to configure the zoom lens system compactly or compose it of a reduced number of lens elements by using an aspherical surface in any of the lens units other than the fourth lens unit. When an aspherical surface is to be used in a lens unit having a positive refractive power other than the fourth lens unit, it is preferable to configure this aspherical surface so as to have a shape which weakens a positive refractive power or strengthen a negative refractive power as portions of the aspherical surface are farther from the optical axis. When an aspherical surface is to be used in a lens unit having a negative refractive power, it is desirable to configure this aspherical surface so as to have a shape which weakens a negative refractive power or strengthens a positive refractive power as portions of the aspherical surface are farther from the optical axis.

For lowering a price of the zoom lens system according to the present invention, it is desirable to compose the first lens unit of a single positive lens element. The zoom lens system according to the present invention has a short focal length since it has a wide field angle and the first lens unit which has a relatively weak refractive power produces chromatic aberration in a small amount. It is therefore possible to compose the first lens unit of a single positive lens element. For a reason similar to that described above, the third lens unit may be composed of a single lens element. Further, the first lens unit and the third lens unit may be composed of plastic lens elements. Plastic lens elements can be used advantageously for composing the first lens unit and the third lens unit since they have weak refractive powers and their focal lengths are varied little due to temperature and humidity variations.

Though description has already been made of the fact that it is desirable to move the second lens unit for focusing the zoom lens system according to the present invention, this zoom lens system may be focused by moving the zoom lens system as a whole or an image pickup device.

Now, description will be made of the preferred embodiments of the zoom lens system according to the present invention.

As seen from FIG. 1 through FIG. 10 illustrating first through tenth embodiments of the zoom lens system according to the present invention, each embodiment is composed, in order from the object side, of a first lens unit having a positive refractive power, a second lens unit having a negative refractive power, a third lens unit having a positive or negative refractive power and a fourth lens unit having a positive refractive power; and configured to change a magnification by moving the second lens unit and the fourth lens unit as shown in the drawing. Further, a stop is fixed on the optical axis at a location between the second lens unit and the third lens unit or between the third lens unit and the fourth lens unit. Further, each of the embodiments is configured to be focused by moving the second lens unit, but the zoom lens system according to the present invention may be focused by moving the lens system as a whole or an image pickup device.

A plane parallel plate traced on the image side of the fourth lens unit in each of the drawings represents optical elements such as optical filters.

The embodiments of the present invention have numerical data which is listed below:

| Embodiment 1 |
| --- |
| f = 4.80~8.31~14.40, F/2.80–F/3.13–F/4.36, <br> 2ω = 70.0°~41.4°~24.4° |

| | | | |
| --- | --- | --- | --- |
| $r_1 = 30.2217$ | | | |
| | $d_1 = 3.2000$ | $n_1 = 1.48749$ | $v_1 = 70.21$ |
| $r_2 = -404.5108$ | | | |
| | $d_2 = D_1$ (variable) | | |
| $r_3 = 28.5136$ | | | |
| | $d_3 = 1.0000$ | $n_2 = 1.77250$ | $v_2 = 49.60$ |
| $r_4 = 5.6270$ | | | |
| | $d_4 = 3.9224$ | | |
| $r_5 = -25.7015$ | | | |
| | $d_5 = 1.0000$ | $n_3 = 1.48749$ | $v_3 = 70.21$ |
| $r_6 = 11.1428$ | | | |
| | $d_6 = 2.8000$ <br> (aspherical surface) | $n_4 = 1.72825$ | $v_4 = 28.46$ |
| $r_7 = 69.3916$ | | | |
| | $d_7 = D_2$ (variable) | | |
| $r_8 = \infty$ | (stop) | | |
| | $d_8 = 1.0000$ | | |
| $r_9 = 13.6604$ | | | |
| | $d_9 = 2.1169$ | $n_5 = 1.69680$ | $v_5 = 55.53$ |
| $r_{10} = 679.9383$ | | | |
| | $d_{10} = 1.0000$ | $n_6 = 1.56732$ | $v_6 = 42.83$ |
| $r_{11} = 12.3125$ | | | |
| | $d_{11} = D_3$ (variable) <br> (aspherical surface) | | |
| $r_{12} = 7.6136$ | | | |
| | $d_{12} = 3.2850$ | $n_7 = 1.71300$ | $v_7 = 53.84$ |
| $r_{13} = -113.6101$ | | | |
| | $d_{13} = 0.1500$ | | |
| $r_{14} = 22.5870$ | | | |
| | $d_{14} = 0.9866$ | $n_8 = 1.84666$ | $v_8 = 23.78$ |
| $r_{15} = 7.0202$ | | | |
| | $d_{15} = 0.8546$ | | |
| $r_{16} = 23.7991$ | | | |

-continued

Embodiment 1

| | | | |
|---|---|---|---|
| | $d_{16} = 2.2000$ | $n_9 = 1.77250$ | $v_9 = 49.60$ |
| $r_{17} = -19.5845$ | | | |
| | $d_{17} = D_4$ (variable) | | |
| $r_{18} = \infty$ | | | |
| | $d_{18} = 4.0000$ | $n_{10} = 1.51633$ | $v_{10} = 64.15$ |
| $r_{19} = \infty$ | | | |
| | $d_{19} = 1.0000$ | | |
| $r_{20} = \infty$ | | | |
| | $d_{20} = 2.1000$ | $n_{11} = 1.51633$ | $v_{11} = 64.15$ |
| $r_{21} = \infty$ | | | |
| | $d_{21} = 4.2200$ | $n_{12} = 1.61700$ | $v_{12} = 62.80$ |
| $r_{22} = \infty$ | | | |
| | $d_{22} = 1.0000$ | | |
| $r_{23} = \infty$ | | | |
| | $d_{23} = 0.8000$ | $n_{13} = 1.51633$ | $v_{13} = 64.15$ |
| $r_{24} = \infty$ | | | |
| | $d_{24} = 1.1997$ | | |
| $r_{25} = \infty$ | (image surface) | | | aspherical surface coefficients (7th surface) $P = 1, A_4 = -1.2573 \times 10^{-4}$,
$A_6 = -4.6430 \times 10^{-6}, A_8 = 7.2449 \times 10^{-8}$
(12th surface) $P = 1, A_4 = -3.0005 \times 10^{-4}$,
$A_6 = -3.9441 \times 10^{-7}, A_8 = -6.4617 \times 10^{-8}$

| object distance | wide<br>∞ | standard<br>∞ | tele<br>∞ |
|---|---|---|---|
| $D_1$ | 1.53999 | 8.31778 | 11.20353 |
| $D_2$ | 11.66566 | 4.88786 | 2.00212 |
| $D_3$ | 8.25015 | 5.81382 | 1.50000 |
| $D_4$ | 1.0000 | 3.43633 | 7.75015 |

| object distance | Wide<br>200 | standard<br>10 | tele<br>10 |
|---|---|---|---|
| $D_1$ | 0.99984 | 3.97914 | 6.95990 |
| $D_2$ | 12.20580 | 9.22650 | 6.24575 |
| $D_3$ | 8.25015 | 5.81382 | 1.50000 |
| $D_4$ | 1.00000 | 3.43633 | 7.75015 |
| imaging magnification | -0.02197 | -0.24014 | -0.34722 |
| NA | -0.00392 | -0.03838 | -0.03984 |

$f_4/f_1 = 0.20, \beta_{4T} = -0.96, \beta_{2T} = -0.24$
$\beta_{4T}/\beta_{4W} = 2.04 (\beta_{2T}/\beta_{2W}), f_W/f_1 = 0.08, f_W/f_4 = 0.42$
$f_4/f_3 = 0.10, (r_{F1} + r_{R1})/(r_{F1} - r_{R1}) = 1.90$

Embodiment 2

$f = 4.80\sim9.60\sim19.20, F/2.80\sim F/3.08\sim F/4.52,$
$2\omega = 71.6°\sim35.4°\sim18.2°$

| | | | |
|---|---|---|---|
| $r_1 = 20.6636$ | | | |
| | $d_1 = 4.8000$ | $n_1 = 1.48749$ | $v_1 = 70.21$ |
| $r_2 = -533.1705$ | | | |
| | $d_2 = D_1$ (variable) | | |
| $r_3 = 31.7012$ | | | |
| | $d_3 = 1.0000$ | $n_2 = 1.77250$ | $v_2 = 49.60$ |
| $r_4 = 4.7345$ | | | |
| | $d_4 = 4.2362$ | | |
| $r_5 = 23.3134$ | | | |
| | $d_5 = 1.0000$ | $n_3 = 1.48749$ | $v_3 = 70.21$ |
| $r_6 = 18.3749$ | | | |
| | $d_6 = 2.8000$ | $n_4 = 1.72825$ | $v_4 = 28.46$ |
| $r_7 = 22.8073$ | (aspherical surface) | | |
| | $d_7 = D_2$ (variable) | | |
| $r_8 = \infty$ | (stop) | | |
| | $d_8 = 1.0000$ | | |
| $r_9 = 8.6138$ | | | |
| | $d_9 = 1.0000$ | $n_5 = 1.69680$ | $v_5 = 55.53$ |
| $r_{10} = 4.4182$ | | | |
| | $d_{10} = 2.5000$ | $n_6 = 1.56138$ | $v_6 = 45.19$ |
| $r_{11} = 12.2819$ | | | |
| | $d_{11} = d_3$ (variable) | | |

-continued

Embodiment 2

| | | | |
|---|---|---|---|
| $r_{12} = 7.5867$ | (aspherical surface) | | |
| | $d_{12} = 2.9721$ | $n_7 = 1.71300$ | $v_7 = 53.84$ |
| $r_{13} = -232.4255$ | | | |
| | $d_{13} = 0.1500$ | | |
| $r_{14} = 27.2266$ | | | |
| | $d_{14} = 0.9866$ | $n_8 = 1.84666$ | $v_8 = 23.78$ |
| $r_{15} = 7.0388$ | | | |
| | $d_{15} = 1.6607$ | | |
| $r_{16} = 20.3880$ | | | |
| | $d_{16} = 2.2000$ | $n_9 = 1.77250$ | $v_9 = 49.60$ |
| $r_{17} = -20.2739$ | | | |
| | $d_{17} = D_4$ (variable) | | |
| $r_{18} = \infty$ | | | |
| | $d_{18} = 4.0000$ | $n_{10} = 1.51633$ | $v_{10} = 64.15$ |
| $r_{19} = \infty$ | | | |
| | $d_{19} = 1.0000$ | | |
| $r_{20} = \infty$ | | | |
| | $d_{20} = 2.1000$ | $n_{11} = 1.51633$ | $v_{11} = 64.15$ |
| $r_{21} = \infty$ | | | |
| | $d_{21} = 4.2200$ | $n_{12} = 1.61700$ | $v_{12} = 62.80$ |
| $r_{22} = \infty$ | | | |
| | $d_{22} = 1.0000$ | | |
| $r_{23} = \infty$ | | | |
| | $d_{23} = 0.8000$ | $n_{13} = 1.51633$ | $v_{13} = 64.15$ |
| $r_{24} = \infty$ | | | |
| | $d_{24} = 1.9798$ | | |
| $r_{25} = \infty$ | (image surface) | | | aspherical surface coefficients (7th surface) $P = 1, A_4 = -3.3980 \times 10^{-4}$,
$A_6 = -1.8520 \times 10^{-5}, A_8 = -1.7438 \times 10^{-8}$
(12th surface) $P = 1, A_4 = -2.4947 \times 10^{-4}$,
$A_6 = 3.4277 \times 10^{-8}, A_8 = -7.8226 \times 10^{-8}$

| object distance | wide<br>∞ | standard<br>∞ | tele<br>∞ |
|---|---|---|---|
| $D_1$ | 1.21911 | 8.77823 | 12.00073 |
| $D_2$ | 12.78374 | 5.22462 | 2.00212 |
| $D_3$ | 9.63508 | 6.89535 | 1.50000 |
| $D_4$ | 1.00000 | 3.73973 | 9.13508 |

| object distance | wide<br>500 | standard<br>500 | tele<br>500 |
|---|---|---|---|
| $D_1$ | 0.99998 | 8.37224 | 11.43087 |
| $D_2$ | 13.00287 | 5.63060 | 2.57198 |
| $D_3$ | 9.63508 | 6.89535 | 1.50000 |
| $D_4$ | 1.00000 | 3.73973 | 9.13508 |

$f_4/f_1 = 0.30, \beta_{4T} = -1.03, \beta_{2T} = -0.41$,
$\beta_{4T}/\beta_{4W} = 1.77 (\beta_{2T}/\beta_{2W}), f_W/f_1 = 0.12, f_W/f_4 = 0.39$,
$f_4/f_3 = 0.15, (r_{F1} + r_{R1})/(r_{F1} - r_{R1}) = 1.70$

Embodiment 3

$f = 4.80\sim8.98\sim16.80, F/2.80\sim F/3.17\sim F/4.88,$
$2\omega = 69.4°\sim36.6°\sim20.8°$

| | | | |
|---|---|---|---|
| $r_1 = 24.6646$ | | | |
| | $d_1 = 1.0000$ | $n_1 = 1.80518$ | $v_1 = 25.43$ |
| $r_2 = 21.7287$ | | | |
| | $d_2 = 1.0000$ | | |
| $r_3 = 35.2428$ | | | |
| | $d_3 = 4.0000$ | $n_2 = 1.51633$ | $v_2 = 64.15$ |
| $r_4 = -57.7414$ | | | |
| | $d_4 = D_1$ (variable) | | |
| $r_5 = -127.5440$ | | | |
| | $d_5 = 1.0000$ | $n_3 = 1.77250$ | $v_3 = 49.60$ |
| $r_6 = 4.9939$ | | | |
| | $d_6 = 2.5618$ | | |
| $r_7 = 22.8410$ | | | |
| | $d_7 = 2.3000$ | $n_4 = 1.84666$ | $v_4 = 23.78$ |
| $r_8 = 266.9477$ | (aspherical surface) | | |

Embodiment 3

| | | | |
|---|---|---|---|
| $r_9 = \infty$ | $d_8 = D_2$ (variable) (stop) | | |
| | $d_9 = 1.0000$ | | |
| $r_{10} = 8.9364$ | | | |
| | $d_{10} = 1.3000$ | $n_5 = 1.51633$ | $\nu_5 = 64.15$ |
| $r_{11} = 8.7258$ | | | |
| | $d_{11} = D_3$ (variable) (aspherical surface) | | |
| $r_{12} = 7.4998$ | | | |
| | $d_{12} = 3.8883$ | $n_6 = 1.67790$ | $\nu_6 = 55.33$ |
| $r_{13} = -72.9268$ | | | |
| | $d_{13} = 0.2756$ | | |
| $r_{14} = 22.2557$ | | | |
| | $d_{14} = 1.0000$ | $n_7 = 1.84666$ | $\nu_7 = 23.78$ |
| $r_{15} = 6.7138$ | | | |
| | $d_{15} = 0.8471$ | | |
| $r_{16} = 20.1290$ | | | |
| | $d_{16} = 2.2000$ | $n_8 = 1.77250$ | $\nu_8 = 49.60$ |
| $r_{17} = -19.1260$ | | | |
| | $d_{17} = D_4$ (variable) | | |
| $r_{18} = \infty$ | | | |
| | $d_{18} = 4.0000$ | $n_9 = 1.51633$ | $\nu_9 = 64.15$ |
| $r_{19} = \infty$ | | | |
| | $d_{19} = 1.0000$ | | |
| $r_{20} = \infty$ | | | |
| | $d_{20} = 2.1000$ | $n_{10} = 1.51633$ | $\nu_{10} = 64.15$ |
| $r_{21} = \infty$ | | | |
| | $d_{21} = 4.2200$ | $n_{11} = 1.61700$ | $\nu_{11} = 62.80$ |
| $r_{22} = \infty$ | | | |
| | $d_{22} = 1.0000$ | | |
| $r_{23} = \infty$ | | | |
| | $d_{23} = 0.8000$ | $n_{12} = 1.51633$ | $\nu_{12} = 64.15$ |
| $r_{24} = \infty$ | | | |
| | $d_{24} = 1.1996$ (image surface) | | |
| $r_{25} = \infty$ | | | | aspherical surface coefficients (8th surface) $P = 1$, $A_4 = -3.2539 \times 10^{-4}$,
$A_6 = -1.2741 \times 10^{-5}$, $A_8 = -1.7372 \times 10^{-7}$
(12th surface) $P = 1$, $A_4 = -3.0986 \times 10^{-4}$,
$A_6 = -4.4168 \times 10^{-7}$, $A_8 = -7.4818 \times 10^{-8}$

| object distance | wide $\infty$ | standard $\infty$ | tele $\infty$ |
|---|---|---|---|
| $D_1$ | 1.56985 | 9.09074 | 11.53549 |
| $D_2$ | 11.96776 | 4.44687 | 2.00212 |
| $D_3$ | 9.36708 | 6.84144 | 1.50000 |
| $D_4$ | 1.00000 | 3.52565 | 8.86708 |

| object distance | wide 400 | standard 400 | tele 400 |
|---|---|---|---|
| $D_1$ | 1.23960 | 8.59854 | 10.96380 |
| $D_2$ | 12.29802 | 4.93907 | 2.57381 |
| $D_3$ | 9.36708 | 6.84144 | 1.50000 |
| $D_4$ | 1.00000 | 3.52565 | 8.86708 |

$f_4/f_1 = 0.22$, $\beta_{4T} = -1.11$, $\beta_{ZT} = -0.30$,
$\beta_{4T}/\beta_{4W} = 1.99$ ($\beta_{ZT}/\beta_{2W}$), $f_W/f_1 = 0.09$, $f_W/f_4 = 0.42$,
$f_4/f_3 = 0.01$, $(r_{F1} + r_{R1})/(r_{F1} - r_{R1}) = 1.86$

Embodiment 4

$f = 4.80 \sim 8.31 \sim 14.40$, $F/2.80 \sim F/3.15 \sim F/4.32$,
$2\omega = 70.2° \sim 41.6° \sim 24.6°$

| | | | |
|---|---|---|---|
| $r_1 = 32.2822$ | | | |
| | $d_1 = 3.0000$ | $n_1 = 1.51633$ | $\nu_1 = 64.15$ |
| $r_2 = 1315.9478$ | | | |
| | $d_2 = D_1$ (variable) | | |
| $r_3 = 31.8864$ | | | |
| | $d_3 = 1.0000$ | $n_2 = 1.77250$ | $\nu_2 = 49.60$ |
| $r_4 = 5.6430$ | | | |
| | $d_4 = 3.7918$ | | |
| $r_5 = -28.1638$ | | | |
| | $d_5 = 1.0000$ | $n_3 = 1.48749$ | $\nu_3 = 70.21$ |
| $r_6 = 21.7561$ | | | |
| | $d_6 = 2.4000$ (aspherical surface) | $n_4 = 1.80518$ | $\nu_4 = 25.43$ |
| $r_7 = -200.0000$ | | | |
| | $d_7 = D_2$ (variable) | | |
| $r_8 = \infty$ | | | |
| | $d_8 = 1.0000$ (stop) | | |
| $r_9 = 17.1706$ | | | |
| | $d_9 = 1.3000$ | $n_5 = 1.51633$ | $\nu_5 = 64.15$ |
| $r_{10} = 17.8470$ | | | |
| | $d_{10} = D_3$ (variable) (aspherical surface) | | |
| $r_{11} = 7.2818$ | | | |
| | $d_{11} = 3.7104$ | $n_6 = 1.67790$ | $\nu_6 = 55.33$ |
| $r_{12} = -56.4418$ | | | |
| | $d_{12} = 0.1319$ | | |
| $r_{13} = 23.3804$ | | | |
| | $d_{13} = 1.0000$ | $n_7 = 1.84666$ | $\nu_7 = 23.78$ |
| $r_{14} = 6.5725$ | | | |
| | $d_{14} = 0.8668$ | | |
| $r_{15} = 21.4669$ | | | |
| | $d_{15} = 2.2000$ | $n_8 = 1.77250$ | $\nu_8 = 49.60$ |
| $r_{16} = -20.1029$ | | | |
| | $d_{16} = D_4$ (variable) | | |
| $r_{17} = \infty$ | | | |
| | $d_{17} = 4.0000$ | $n_9 = 1.51633$ | $\nu_9 = 64.15$ |
| $r_{18} = \infty$ | | | |
| | $d_{18} = 1.0000$ | | |
| $r_{19} = \infty$ | | | |
| | $d_{19} = 2.1000$ | $n_{10} = 1.51633$ | $\nu_{10} = 64.15$ |
| $r_{20} = \infty$ | | | |
| | $d_{20} = 4.2200$ | $n_{11} = 1.61700$ | $\nu_{11} = 62.80$ |
| $r_{21} = \infty$ | | | |
| | $d_{21} = 1.0000$ | | |
| $r_{22} = \infty$ | | | |
| | $d_{22} = 0.8000$ | $n_{12} = 1.51633$ | $\nu_{12} = 64.15$ |
| $r_{23} = \infty$ | | | |
| | $d_{23} = 1.1993$ (image surface) | | |
| $r_{24} = \infty$ | | | | aspherical surface coefficients (7th surface) $P = 1$, $A_4 = -1.7097 \times 10^{-4}$,
$A_6 = -2.4272 \times 10^{-6}$, $A_8 = -4.2782 \times 10^{-8}$
(11th surface) $P = 1$, $A_4 = -3.3609 \times 10^{-4}$,
$A_6 = -9.5814 \times 10^{-7}$, $A_8 = -7.9857 \times 10^{-8}$

| object distance | wide $\infty$ | standard $\infty$ | tele $\infty$ |
|---|---|---|---|
| $D_1$ | 1.66003 | 9.12960 | 12.57108 |
| $D_2$ | 12.91317 | 5.44359 | 2.00212 |
| $D_3$ | 7.79779 | 5.56715 | 1.50000 |
| $D_4$ | 1.01693 | 3.24758 | 7.31473 |

| object distance | wide 200 | standard 10 | tele 10 |
|---|---|---|---|
| $D_1$ | 0.99993 | 3.89538 | 7.53118 |
| $D_2$ | 13.57327 | 10.67782 | 7.04201 |
| $D_3$ | 7.79779 | 5.56715 | 1.50000 |
| $D_4$ | 1.01693 | 3.24758 | 7.31473 |

$f_4/f_1 = 0.18$, $\beta_{4T} = -0.94$, $\beta_{ZT} = -0.24$,
$\beta_{4T}/\beta_{4W} = 1.88$ ($\beta_{ZT}/\beta_{2W}$), $f_W/f_1 = 0.07$, $f_W/f_4 = 0.42$,
$f_4/f_3 = 0.02$, $(r_{F1} + r_{R1})/(r_{F1} - r_{R1}) = 1.78$

Embodiment 5

$f = 4.80 \sim 8.31 \sim 14.40$, $F/2.80 \sim F/3.13 \sim F/4.29$,
$2\omega = 70.0° \sim 41.6° \sim 24.6°$

| | | | |
|---|---|---|---|
| $r_1 = 73.7040$ | | | |
| | $d_1 = 2.2000$ | $n_1 = 1.60311$ | $\nu_1 = 60.70$ |
| $r_2 = -251.3948$ | | | |

Embodiment 5

| | | | | |
|---|---|---|---|---|
| | $d_2 = D_1$ (variable) | | | |
| $r_3 =$ | 31.4537 | | | |
| | $d_3 = 1.0000$ | $n_2 = 1.77250$ | $\upsilon_2 =$ | 49.60 |
| $r_4 =$ | 5.9703 | | | |
| | $d_4 = 2.5649$ | | | |
| $r_5 =$ | 14.8321 | | | |
| | $d_5 = 1.0000$ | $n_3 = 1.48749$ | $\upsilon_3 =$ | 70.21 |
| $r_6 =$ | 8.1922 | | | |
| | $d_6 = 2.8000$ | $n_4 = 1.80518$ | $\upsilon_4 =$ | 25.43 |
| $r_7 =$ | 11.8606 (aspherical surface) | | | |
| | $d_7 = D_2$ (variable) | | | |
| $r_8 =$ | ∞ (stop) | | | |
| | $d_8 = 1.0000$ | | | |
| $r_9 =$ | 11.1830 | | | |
| | $d_9 = 1.5000$ | $n_5 = 1.51633$ | $\upsilon_5 =$ | 64.15 |
| $r_{10} =$ | 14.3638 | | | |
| | $d_{10} = D_3$ (variable) | | | |
| $r_{11} =$ | 6.6376 (aspherical surface) | | | |
| | $d_{11} = 3.5452$ | $n_6 = 1.67790$ | $\upsilon_6 =$ | 55.33 |
| $r_{12} =$ | −53.0828 | | | |
| | $d_{12} = 0.1065$ | | | |
| $r_{13} =$ | 15.6088 | | | |
| | $d_{13} = 1.0000$ | $n_7 = 1.84666$ | $\upsilon_7 =$ | 23.78 |
| $r_{14} =$ | 5.6915 | | | |
| | $d_{14} = 1.1262$ | | | |
| $r_{15} =$ | 20.2174 | | | |
| | $d_{15} = 2.2000$ | $n_8 = 1.71999$ | $\upsilon_8 =$ | 50.25 |
| $r_{16} =$ | −22.7437 | | | |
| | $d_{16} = D_4$ (variable) | | | |
| $r_{17} =$ | ∞ | | | |
| | $d_{17} = 2.1000$ | $n_9 = 1.51633$ | $\upsilon_9 =$ | 64.15 |
| $r_{18} =$ | ∞ | | | |
| | $d_{18} = 4.2200$ | $n_{10} = 1.61700$ | $\upsilon_{10} =$ | 62.80 |
| $r_{19} =$ | ∞ | | | |
| | $d_{19} = 1.0000$ | | | |
| $r_{20} =$ | ∞ | | | |
| | $d_{20} = 0.8000$ | $n_{11} = 1.51633$ | $\upsilon_{11} =$ | 64.15 |
| $r_{21} =$ | ∞ | | | |
| | $d_{21} = 2.4595$ | | | |
| $r_{22} =$ | ∞ (image surface) | | | | aspherical surface coefficients (7th surface) $P = 1$, $A_4 = -2.5367 \times 10^{-4}$,
$A_6 = -7.5684 \times 10^{-6}$, $A_8 = -7.1059 \times 10^{-8}$ (11th surface) $P = 1$, $A_4 = -5.0319 \times 10^{-4}$,
$A_6 = 1.6332 \times 10^{-6}$, $A_8 = -2.4740 \times 10^{-7}$

| object distance | wide ∞ | standard ∞ | tele ∞ |
|---|---|---|---|
| $D_1$ | 1.63036 | 9.60336 | 13.01556 |
| $D_2$ | 13.38732 | 5.41432 | 2.00212 |
| $D_3$ | 7.99812 | 5.58274 | 1.50000 |
| $D_4$ | 1.05392 | 3.46930 | 7.55204 |

| object distance | wide 200 | standard 10 | tele 10 |
|---|---|---|---|
| $D_1$ | 0.99993 | 4.85754 | 8.58841 |
| $D_2$ | 14.01775 | 10.16013 | 6.42927 |
| $D_3$ | 7.99812 | 5.58274 | 1.50000 |
| $D_4$ | 1.05392 | 3.46930 | 7.55204 |

$f_4/f_1 = 0.12$, $\beta_{4T} = -0.88$, $\beta_{2T} = -0.14$,
$\beta_{4T}/\beta_{4W} = 2.63$ $(\beta_{2T}/\beta_{2W})$, $f_W/f_1 = 0.05$, $f_W/f_4 = 0.44$,
$f_4/f_3 = 0.13$, $(r_{F1} + r_{R1})/(r_{F1} - r_{R1}) = 2.15$

Embodiment 6

$f = 4.80 \sim 8.31 \sim 14.40$, $F/2.80 \sim F/3.18 \sim F/4.64$,
$2\omega = 70.0° \sim 41.4° \sim 24.6°$

| | | | | |
|---|---|---|---|---|
| $r_1 =$ | 25.2730 | | | |
| | $d_1 = 4.0000$ | $n_1 = 1.34139$ | $\upsilon_1 =$ | 93.79 |
| $r_2 =$ | −133.2543 | | | |
| | $d_2 = D_1$ (variable) | | | |
| $r_3 =$ | 47.8800 | | | |
| | $d_3 = 1.0000$ | $n_2 = 1.77250$ | $\upsilon_2 =$ | 49.60 |
| $r_4 =$ | 5.8314 | | | |
| | $d_4 = 3.6769$ | | | |
| $r_5 =$ | −39.1283 | | | |
| | $d_5 = 1.0000$ | $n_3 = 1.48749$ | $\upsilon_3 =$ | 70.21 |
| $r_6 =$ | 16.9614 | | | |
| | $d_6 = 2.4000$ | $n_4 = 1.80518$ | $\upsilon_4 =$ | 25.43 |
| $r_7 =$ | −396.4755 (aspherical surface) | | | |
| | $d_7 = D_2$ (variable) | | | |
| $r_8 =$ | ∞ (stop) | | | |
| | $d_8 = 1.0000$ | | | |
| $r_9 =$ | −21.8233 | | | |
| | $d_9 = 1.0000$ | $n_5 = 1.58423$ | $\upsilon_5 =$ | 30.49 |
| $r_{10} =$ | −35.4237 | | | |
| | $d_{10} = D_3$ (variable) | | | |
| $r_{11} =$ | 7.4903 (aspherical surface) | | | |
| | $d_{11} = 4.1749$ | $n_6 = 1.67790$ | $\upsilon_6 =$ | 55.33 |
| $r_{12} =$ | −37.9091 | | | |
| | $d_{12} = 0.2660$ | | | |
| $r_{13} =$ | 21.8535 | | | |
| | $d_{13} = 1.0000$ | $n_7 = 1.84666$ | $\upsilon_7 =$ | 23.78 |
| $r_{14} =$ | 6.5502 | | | |
| | $d_{14} = 0.8174$ | | | |
| $r_{15} =$ | 18.8072 | | | |
| | $d_{15} = 2.2000$ | $n_8 = 1.77250$ | $\upsilon_8 =$ | 49.60 |
| $r_{16} =$ | −23.5069 | | | |
| | $d_{16} = D_4$ (variable) | | | |
| $r_{17} =$ | ∞ | | | |
| | $d_{17} = 4.0000$ | $n_9 = 1.51633$ | $\upsilon_9 =$ | 64.15 |
| $r_{18} =$ | ∞ | | | |
| | $d_{18} = 1.0000$ | | | |
| $r_{19} =$ | ∞ | | | |
| | $d_{19} = 2.1000$ | $n_{10} = 1.51633$ | $\upsilon_{10} =$ | 64.15 |
| $r_{20} =$ | ∞ | | | |
| | $d_{20} = 4.2200$ | $n_{11} = 1.61700$ | $\upsilon_{11} =$ | 62.80 |
| $r_{21} =$ | ∞ | | | |
| | $d_{21} = 1.0000$ | | | |
| $r_{22} =$ | ∞ | | | |
| | $d_{22} = 0.8000$ | $n_{12} = 1.51633$ | $\upsilon_{12} =$ | 64.15 |
| $r_{23} =$ | ∞ | | | |
| | $d_{23} = 1.2000$ | | | |
| $r_{24} =$ | ∞ (image surface) | | | | aspherical surface coefficients (7th surface) $P = 1$, $A_4 = -1.7760 \times 10^{-4}$,
$A_6 = -3.0800 \times 10^{-6}$, $A_8 = 1.6998 \times 10^{-9}$ (11th surface) $P = 1$, $A_4 = -3.5982 \times 10^{-4}$,
$A_6 = -2.9379 \times 10^{-7}$, $A_8 = -8.1428 \times 10^{-8}$

| object distance | wide ∞ | standard ∞ | tele ∞ |
|---|---|---|---|
| $D_1$ | 1.76145 | 9.00185 | 11.55882 |
| $D_2$ | 11.79949 | 4.55909 | 2.00212 |
| $D_3$ | 8.01872 | 5.89329 | 1.42966 |
| $D_4$ | 1.10574 | 3.23118 | 7.69480 |

| object distance | wide 200 | standard 10 | tele 10 |
|---|---|---|---|
| $D_1$ | 0.99997 | 3.18551 | 5.88352 |
| $D_2$ | 12.56097 | 10.37543 | 7.67742 |
| $D_3$ | 8.01872 | 5.89329 | 1.42966 |
| $D_4$ | 1.10574 | 3.23118 | 7.69480 |

$f_4/f_1 = 0.18$, $\beta_{4T} = -1.09$, $\beta_{2T} = -0.26$,
$\beta_{4T}/\beta_{4W} = 1.77$ $(\beta_{2T}/\beta_{2W})$, $f_W/f_1 = 0.08$, $f_W/f_4 = 0.43$,
$f_4/f_3 = -0.11$, $(r_{F1} + r_{R1})/(r_{F1} - r_{R1}) = 1.86$

| Embodiment 7 |
| --- |
| $f = 4.80 \sim 8.31 \sim 14.40$, $F/2.80 \sim F/3.14 \sim F/4.24$, $2\omega = 70.2° \sim 41.2° \sim 24.4°$ |

| | | | |
| --- | --- | --- | --- |
| $r_1 =$ 52.9375 | | | |
| | $d_1 = 2.8000$ | $n_1 = 1.60311$ | $\upsilon_1 = 60.70$ |
| $r_2 =$ −185.1334 | | | |
| | $d_2 = D_1$ (variable) | | |
| $r_3 =$ 30.6812 | | | |
| | $d_3 = 1.0000$ | $n_2 = 1.77250$ | $\upsilon_2 = 49.60$ |
| $r_4 =$ 6.8533 | | | |
| | $d_4 = 4.3009$ | | |
| $r_5 =$ −16.1611 | | | |
| | $d_5 = 1.0000$ | $n_3 = 1.48749$ | $\upsilon_3 = 70.21$ |
| $r_6 =$ 13.6857 | | | |
| | $d_6 = 2.4000$ | $n_4 = 1.80518$ | $\upsilon_4 = 25.43$ |
| $r_7 =$ 57.5052 | | | |
| | $d_7 = D_2$ (variable) | | |
| $r_8 = \infty$ (stop) | | | |
| | $d_8 = 1.0000$ | | |
| $r_9 =$ −51.9348 | | | |
| | $d_9 = 1.5000$ | $n_5 = 1.51633$ | $\upsilon_5 = 64.15$ |
| $r_{10} =$ −26.5762 (aspherical surface) | | | |
| | $d_{10} = D_3$ (variable) | | |
| $r_{11} =$ 6.8710 (aspherical surface) | | | |
| | $d_{11} = 3.7666$ | $n_6 = 1.67790$ | $\upsilon_6 = 55.33$ |
| $r_{12} =$ 452.4983 | | | |
| | $d_{12} = 0.1545$ | | |
| $r_{13} =$ 23.8871 | | | |
| | $d_{13} = 1.0000$ | $n_7 = 1.84666$ | $\upsilon_7 = 23.78$ |
| $r_{14} =$ 6.4093 | | | |
| | $d_{14} = 0.9156$ | | |
| $r_{15} =$ 24.5394 | | | |
| | $d_{15} = 2.2000$ | $n_8 = 1.71999$ | $\upsilon_8 = 50.25$ |
| $r_{16} =$ −15.2331 | | | |
| | $d_{16} = D_4$ (variable) | | |
| $r_{17} = \infty$ | | | |
| | $d_{17} = 4.0000$ | $n_9 = 1.51633$ | $\upsilon_9 = 64.15$ |
| $r_{18} = \infty$ | | | |
| | $d_{18} = 1.0000$ | | |
| $r_{19} = \infty$ | | | |
| | $d_{19} = 2.1000$ | $n_{10} = 1.51633$ | $\upsilon_{10} = 64.15$ |
| $r_{20} = \infty$ | | | |
| | $d_{20} = 4.2200$ | $n_{11} = 1.61700$ | $\upsilon_{11} = 62.80$ |
| $r_{21} = \infty$ | | | |
| | $d_{21} = 1.0000$ | | |
| $r_{22} = \infty$ | | | |
| | $d_{22} = 0.8000$ | $n_{12} = 1.51633$ | $\upsilon_{12} = 64.15$ |
| $r_{23} = \infty$ | | | |
| | $d_{23} = 1.1967$ | | |
| $r_{24} = \infty$ (image surface) | | | | aspherical surface coefficients

| | |
| --- | --- |
| (10th surface) | $P = 1$, $A_4 = -1.1669 \times 10^{-4}$, $A_6 = 4.3658 \times 10^{-6}$, $A_8 = -1.5811 \times 10^{-7}$ |
| (11th surface) | $P = 1$, $A_4 = -3.5478 \times 10^{-4}$, $A_6 = -6.4110 \times 10^{-7}$, $A_8 = -1.2009 \times 10^{-7}$ |

| object distance | wide ∞ | standard ∞ | tele ∞ |
| --- | --- | --- | --- |
| $D_1$ | 1.53667 | 8.81405 | 12.21681 |
| $D_2$ | 12.68226 | 5.40488 | 2.00212 |
| $D_3$ | 8.40777 | 5.86593 | 1.50000 |
| $D_4$ | 1.00000 | 3.54184 | 7.90777 |

| object distance | wide 200 | standard 10 | tele 10 |
| --- | --- | --- | --- |
| $D_1$ | 0.99994 | 4.60960 | 8.18806 |
| $D_2$ | 13.21899 | 9.60933 | 6.03087 |
| $D_3$ | 8.40777 | 5.86593 | 1.50000 |
| $D_4$ | 1.00000 | 3.54184 | 7.90777 |

$f_4/f_1 = 0.18$, $\beta_{4T} = -0.87$, $\beta_{ZT} = -0.19$
$\beta_{4T}/\beta_{4W} = 2.23$ ($\beta_{ZT}/\beta_{2W}$), $f_W/f_1 = 0.07$, $f_W/f_4 = 0.39$,
$f_4/f_3 = 0.12$, $(r_{F1} + r_{R1})/(r_{F1} - r_{R1}) = 1.73$

| Embodiment 8 |
| --- |
| $f = 4.80 \sim 8.31 \sim 14.40$, $F/2.80 \sim F/3.23 \sim F/4.61$, $2\omega = 70.0° \sim 41.2° \sim 24.4°$ |

| | | | |
| --- | --- | --- | --- |
| $r_1 =$ 36.2992 | | | |
| | $d_1 = 3.0000$ | $n_1 = 1.51633$ | $\upsilon_1 = 64.15$ |
| $r_2 =$ −157.8250 | | | |
| | $d_2 = D_1$ (variable) | | |
| $r_3 =$ 41.8214 | | | |
| | $d_3 = 1.0000$ | $n_2 = 1.77250$ | $\upsilon_2 = 49.60$ |
| $r_4 =$ 6.9783 | | | |
| | $d_4 = 4.9592$ | | |
| $r_5 =$ −19.6840 | | | |
| | $d_5 = 1.0000$ | $n_3 = 1.48749$ | $\upsilon_3 = 70.21$ |
| $r_6 =$ 11.1778 | | | |
| | $d_6 = 1.8000$ | $n_4 = 1.84666$ | $\upsilon_4 = 23.78$ |
| $r_7 =$ 24.5817 | | | |
| | $d_7 = D_2$ (variable) | | |
| $r_8 =$ 17.7652 | | | |
| | $d_8 = 1.3000$ | $n_5 = 1.51633$ | $\upsilon_5 = 64.15$ |
| $r_9 =$ 35.2411 | | | |
| | $d_9 = 1.0000$ | | |
| $r_{10} = \infty$ (stop) | | | |
| | $d_{10} = D_3$ (variable) | | |
| $r_{11} =$ 7.1767 (aspherical surface) | | | |
| | $d_{11} = 3.5312$ | $n_6 = 1.67790$ | $\upsilon_6 = 55.33$ |
| $r_{12} =$ −96.4251 | | | |
| | $d_{12} = 0$ | | |
| $r_{13} =$ 22.1881 | | | |
| | $d_{13} = 1.0000$ | $n_7 = 1.84666$ | $\upsilon_7 = 23.78$ |
| $r_{14} =$ 6.6315 | | | |
| | $d_{14} = 0.9544$ | | |
| $r_{15} =$ 28.0121 | | | |
| | $d_{15} = 2.2000$ | $n_8 = 1.69680$ | $\upsilon_8 = 55.53$ |
| $r_{16} =$ −14.4998 | | | |
| | $d_{16} = D_4$ (variable) | | |
| $r_{17} = \infty$ | | | |
| | $d_{17} = 4.0000$ | $n_9 = 1.51633$ | $\upsilon_9 = 64.15$ |
| $r_{18} = \infty$ | | | |
| | $d_{18} = 1.0000$ | | |
| $r_{19} = \infty$ | | | |
| | $d_{19} = 2.1000$ | $n_{10} = 1.51633$ | $\upsilon_{10} = 64.15$ |
| $r_{20} = \infty$ | | | |
| | $d_{20} = 4.2200$ | $n_{11} = 1.61700$ | $\upsilon_{11} = 62.80$ |
| $r_{21} = \infty$ | | | |
| | $d_{21} = 1.0000$ | | |
| $r_{22} = \infty$ | | | |
| | $d_{22} = 0.8000$ | $n_{12} = 1.51633$ | $\upsilon_{12} = 64.15$ |
| $r_{23} = \infty$ | | | |
| | $d_{23} = 1.1982$ | | |
| $r_{24} = \infty$ (image surface) | | | | aspherical surface coefficients

| | |
| --- | --- |
| (11th surface) | $P = 1$, $A_4 = -3.6075 \times 10^{-4}$, $A_6 = -1.0505 \times 10^{-6}$, $A_8 = -6.7194 \times 10^{-8}$ |

| object diatance | wide ∞ | standard ∞ | tele ∞ |
| --- | --- | --- | --- |
| $D_1$ | 1.43242 | 7.53979 | 10.04047 |
| $D_2$ | 10.61016 | 4.50280 | 2.00212 |
| $D_3$ | 8.71208 | 6.01416 | 1.41509 |
| $D_4$ | 0.90211 | 3.60003 | 8.19910 |

| object distance | wide 200 | standard 10 | tele 10 |
| --- | --- | --- | --- |
| $D_1$ | 0.99979 | 4.04363 | 6.61705 |
| $D_2$ | 11.04279 | 7.99896 | 5.42554 |
| $D_3$ | 8.71208 | 6.01416 | 1.41509 |
| $D_4$ | 0.90211 | 3.60003 | 8.19910 |

$f_4/f_1 = 0.21$, $\beta_{4T} = -0.95$, $\beta_{ZT} = -0.21$
$\beta_{4T}/\beta_{4W} = 2.33$ ($\beta_{ZT}/\beta_{2W}$), $f_W/f_1 = 0.08$, $f_W/f_4 = 0.41$,
$f_4/f_3 = 0.17$, $(r_{F1} + r_{R1})/(r_{F1} - r_{R1}) = 1.85$

Embodiment 9 f = 4.80 ~ 8.31 ~ 14.40, F/2.80 ~ F/3.16 ~ F/4.27
2ω = 69.8° ~ 41.2° ~ 24.4°

| | | | |
|---|---|---|---|
| $r_1$ = | 30.9414 | | |
| | $d_1$ = 3.0000 | $n_1$ = 1.51633 | $\nu_1$ = 64.15 |
| $r_2$ = | −405.6934 | | |
| | $d_2 = D_1$ (variable) | | |
| $r_3$ = | 15.1541 | | |
| | $d_3$ = 1.0000 | $n_2$ = 1.77250 | $\nu_2$ = 49.60 |
| $r_4$ = | 4.9491 | | |
| | $d_4$ = 5.4245 | | |
| $r_5$ = | −27.8407 | | |
| | $d_5$ = 1.1026 | $n_3$ = 1.72916 | $\nu_3$ = 54.68 |
| $r_6$ = | 15.5236 | | |
| | $d_6$ = 0.3119 | | |
| $r_7$ = | 9.1363 | | |
| | $d_7$ = 1.8000 | $n_4$ = 1.84666 | $\nu_4$ = 23.78 |
| $r_8$ = | 14.9186 | | |
| | $d_8 = D_2$ (variable) | | |
| $r_9$ = | ∞ (stop) | | |
| | $d_9$ = 1.0000 | | |
| $r_{10}$ = | −23.6198 | | |
| | $d_{10}$ = 1.3000 | $n_5$ = 1.60311 | $\nu_5$ = 60.68 |
| $r_{11}$ = | −11.1802 | | |
| | $d_{11} = D_3$ (variable) | | |
| $r_{12}$ = | 6.9398 (aspherical surface) | | |
| | $d_{12}$ = 3.4600 | $n_6$ = 1.67790 | $\nu_6$ = 55.33 |
| $r_{13}$ = | 60.1072 | | |
| | $d_{13}$ = 0.1285 | | |
| $r_{14}$ = | 19.8796 | | |
| | $d_{14}$ = 1.0000 | $n_7$ = 1.84666 | $\nu_7$ = 23.78 |
| $r_{15}$ = | 6.3091 | | |
| | $d_{15}$ = 0.8753 | | |
| $r_{16}$ = | 22.7725 | | |
| | $d_{16}$ = 2.2000 | $n_8$ = 1.69680 | $\nu_8$ = 55.53 |
| $r_{17}$ = | −18.9361 | | |
| | $d_{17} = D_4$ (variable) | | |
| $r_{18}$ = | ∞ | | |
| | $d_{18}$ = 4.0000 | $n_9$ = 1.51633 | $\nu_9$ = 64.15 |
| $r_{19}$ = | ∞ | | |
| | $d_{19}$ = 1.0000 | | |
| $r_{20}$ = | ∞ | | |
| | $d_{20}$ = 2.1000 | $n_{10}$ = 1.51633 | $\nu_{10}$ = 64.15 |
| $r_{21}$ = | ∞ | | |
| | $d_{21}$ = 4.2200 | $n_{11}$ = 1.61700 | $\nu_{11}$ = 62.80 |
| $r_{22}$ = | ∞ | | |
| | $d_{22}$ = 1.0000 | | |
| $r_{23}$ = | ∞ | | |
| | $d_{23}$ = 0.8000 | $n_{12}$ = 1.51633 | $\nu_{12}$ = 64.15 |
| $r_{24}$ = | ∞ | | |
| | $d_{24}$ = 1.2000 | | |
| $r_{25}$ = | ∞ (image surface) | | | aspherical surface coefficients (12th surface)  P = 1,  $A_4 = -2.2891 \times 10^{-4}$,
$A_6 = -2.1934 \times 10^{-6}$,  $A_8 = -7.4450 \times 10^{-8}$

| object distance | wide ∞ | standard ∞ | tele ∞ |
|---|---|---|---|
| $D_1$ | 1.29761 | 7.10310 | 9.88411 |
| $D_2$ | 10.58862 | 4.78313 | 2.00212 |
| $D_3$ | 9.84483 | 6.54027 | 1.50000 |
| $D_4$ | 0.99433 | 4.29889 | 9.33916 |

| object distance | wide 200 | standard 10 | tele 10 |
|---|---|---|---|
| $D_1$ | 1.00000 | 4.63093 | 7.46556 |
| $D_2$ | 10.88623 | 7.25530 | 4.42067 |
| $D_3$ | 9.84483 | 6.54027 | 1.50000 |
| $D_4$ | 0.99433 | 4.29889 | 9.33916 |

$f_4/f_1 = 0.25$,  $\beta_{4T} = -0.75$,  $\beta_{2T} = -0.18$,
$\beta_{4T}/\beta_{4W} = 3.75$  $(\beta_{2T}/\beta_{2W})$,  $f_W/f_1 = 0.09$,  $f_W/f_4 = 0.34$,
$f_4/f_3 = 0.42$,  $(r_{F1} + r_{R1})/(r_{F1} - r_{R1}) = 1.93$

Embodiment 10 f = 4.80 ~ 8.31 ~ 14.40, F/2.80 ~ F/3.07 ~ F/4.20,
2ω = 70.2° ~ 41.4° ~ 24.6°

| | | | |
|---|---|---|---|
| $r_1$ = | 29.7134 | | |
| | $d_1$ = 3.0000 | $n_1$ = 1.51633 | $\nu_1$ = 64.15 |
| $r_2$ = | −687.1405 | | |
| | $d_2 = D_1$ (variable) | | |
| $r_3$ = | 20.4521 | | |
| | $d_3$ = 1.0000 | $n_2$ = 1.77250 | $\nu_2$ = 49.60 |
| $r_4$ = | 6.2487 | | |
| | $d_4$ = 4.1029 | | |
| $r_5$ = | −12.5841 | | |
| | $d_5$ = 1.0000 | $n_3$ = 1.48749 | $\nu_3$ = 70.21 |
| $r_6$ = | 11.4821 | | |
| | $d_6$ = 1.8000 | $n_4$ = 1.84666 | $\nu_4$ = 23.78 |
| $r_7$ = | 24.9471 | | |
| | $d_7 = D_2$ (variable) | | |
| $r_8$ = | ∞ (stop) | | |
| | $d_8$ = 1.0000 | | |
| $r_9$ = | 21.6120 | | |
| | $d_9$ = 1.5000 | $n_5$ = 1.51633 | $\nu_5$ = 64.15 |
| $r_{10}$ = | 79.6944 | | |
| | $d_{10} = D_3$ (variable) | | |
| $r_{11}$ = | 8.9316 | | |
| | $d_{11}$ = 2.9722 | $n_6$ = 1.69680 | $\nu_6$ = 55.53 |
| $r_{12}$ = | 70.0748 | | |
| | $d_{12}$ = 0.7855 | | |
| $r_{13}$ = | −30.9127 | | |
| | $d_{13}$ = 1.0000 | $n_7$ = 1.84666 | $\nu_7$ = 23.78 |
| $r_{14}$ = | 16.6505 | | |
| | $d_{14}$ = 0.5284 | | |
| $r_{15}$ = | 21.2083 (aspherical surface) | | |
| | $d_{15}$ = 3.0000 | $n_8$ = 1.71300 | $\nu_8$ = 53.84 |
| $r_{16}$ = | −11.0045 | | |
| | $d_{16} = D_4$ (variable) | | |
| $r_{17}$ = | ∞ | | |
| | $d_{17}$ = 4.0000 | $n_9$ = 1.51633 | $\nu_9$ = 64.15 |
| $r_{18}$ = | ∞ | | |
| | $d_{18}$ = 1.0000 | | |
| $r_{19}$ = | ∞ | | |
| | $d_{19}$ = 2.1000 | $n_{10}$ = 1.51633 | $\nu_{10}$ = 64.15 |
| $r_{20}$ = | ∞ | | |
| | $d_{20}$ = 4.2200 | $n_{11}$ = 1.61700 | $\nu_{11}$ = 62.80 |
| $r_{21}$ = | ∞ | | |
| | $d_{21}$ = 1.0000 | | |
| $r_{22}$ = | ∞ | | |
| | $d_{22}$ = 0.8000 | $n_{12}$ = 1.51633 | $\nu_{12}$ = 64.15 |
| $r_{23}$ = | ∞ | | |
| | $d_{23}$ = 2.5653 | | |
| $r_{24}$ = | ∞ (image surface) | | | aspherical surface coefficients (15th surface)  P = 1,  $A_4 = -4.5208 \times 10^{-4}$,
$A_6 = -1.4652 \times 10^{-6}$,  $A_8 = -1.0836 \times 10^{-8}$

| object distance | wide ∞ | standard ∞ | tele ∞ |
|---|---|---|---|
| $D_1$ | 1.39433 | 7.48045 | 10.04622 |
| $D_2$ | 10.65401 | 4.56789 | 2.00212 |
| $D_3$ | 9.16699 | 6.29425 | 1.50000 |
| $D_4$ | 1.11173 | 3.98447 | 8.77872 |

| object distance | wide 200 | standard 10 | tele 10 |
|---|---|---|---|
| $D_1$ | 0.99994 | 4.30192 | 6.91903 |
| $D_2$ | 11.04840 | 7.74642 | 5.12931 |
| $D_3$ | 9.16699 | 6.29425 | 1.50000 |
| $D_4$ | 1.11173 | 3.98447 | 8.77872 |

$f_4/f_1 = 0.23$,  $\beta_{4T} = -0.93$,  $\beta_{2T} = -0.21$,
$\beta_{4T}/\beta_{4W} = 2.38$  $(\beta_{2T}/\beta_{2W})$,  $f_W/f_1 = 0.09$,  $f_W/f_4 = 0.39$,
$f_4/f_3 = 0.22$,  $(r_{F2} + r_{R2})/(r_{F2} - r_{R2}) = 0.30$ wherein the reference symbols $r_1, r_2, \ldots$ represent radii of curvature on respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $v_1, v_2, \ldots$ represent Abbe's numbers of the respective lens elements. In addition, distances such as focal lengths are represented in millimeters.

The first embodiment has a composition illustrated in FIG. 1, wherein the first lens unit is composed of a single positive lens element for obtaining an advantage for lowering a price of the zoom lens system. Further, the second lens unit is composed of a negative lens element, and a cemented lens component consisting of a negative lens element and a positive lens element; the third lens unit is composed of a cemented lens component consisting of a positive lens element and a negative lens element; and the fourth lens unit is composed of a positive lens component, a negative meniscus lens component and a positive lens component. The first embodiment is designed with $f_4/f_3 > 0$ as specified in the numerical data. Accordingly the third lens unit has a positive refractive power or $f_3 = 108.93$.

For changing a magnification at the wide position to that at the tele position, the second lens unit and the fourth lens unit are moved as shown in FIG. 1 while keeping the first lens unit and the third lens unit stationary. Further, a stop is fixed between the second lens unit and the third lens unit.

The first embodiment is focused by moving the second lens unit. An airspace reserved between the first lens unit and the second lens unit, and another airspace reserved between the second lens unit and the third lens unit are varied by focusing as specified in the numerical data.

The first embodiment uses aspherical surfaces as an image side surface of the second lens unit and an object side surface of the fourth lens unit.

In the second embodiment,the second lens unit is composed of a negative lens element, and a cemented lens component consisting of a negative lens element and a positive lens element, and the negative lens element of said cemented lens component is configured as a negative meniscus lens element which is convex toward the object side. The second embodiment has a composition which is substantially the same as that of the first embodiment except for the second lens unit which is described above. Aspherical surfaces are used as an image side surface of the second lens unit and an object side surface of the fourth lens unit as in the first embodiment. The third lens unit is designed with $f_3 = 83.62$ or has a positive refractive power.

In the third embodiment,the first lens unit is composed of a negative lens element and a positive lens element; the second lens unit is composed of a negative lens element and a positive lens element; third lens unit is composed of a single positive lens element to provide an advantage for lowering a price of the zoom lens system; and fourth lens unit is composed of a positive lens element, a negative lens element and a positive lens element. In the third embodiment, the third lens unit is designed with $f_3 = 650.71$ or has a positive refractive power.

Figure 3:
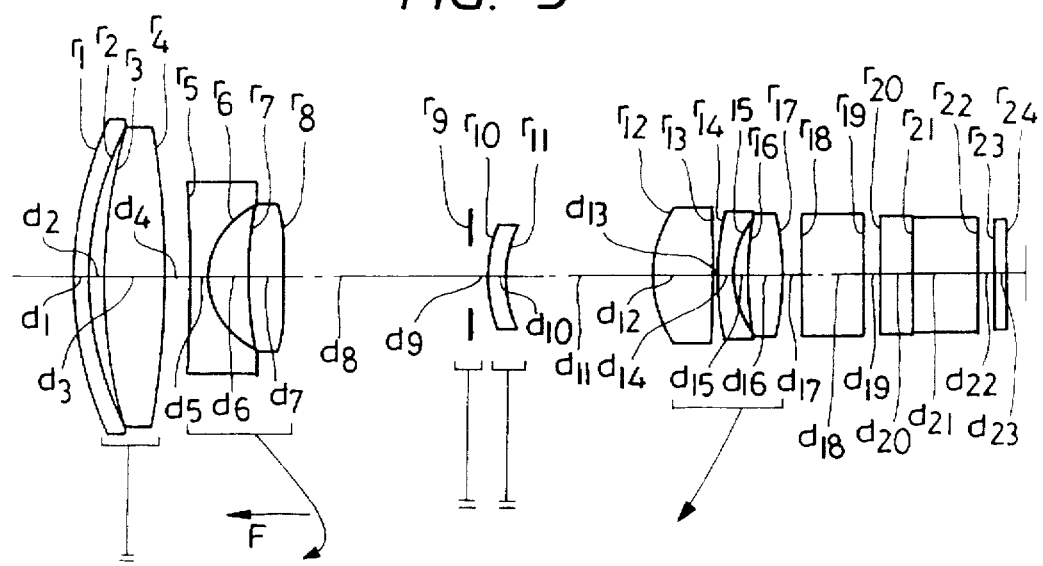

For changing a magnification of the zoom lens system at the wide position to that at the tele position, the second lens unit and the third lens unit are moved as shown in FIG. 3 while the first lens unit and the third lens unit are kept stationary. Further, the third embodiment is focused by moving the second lens unit.

Figure 4:
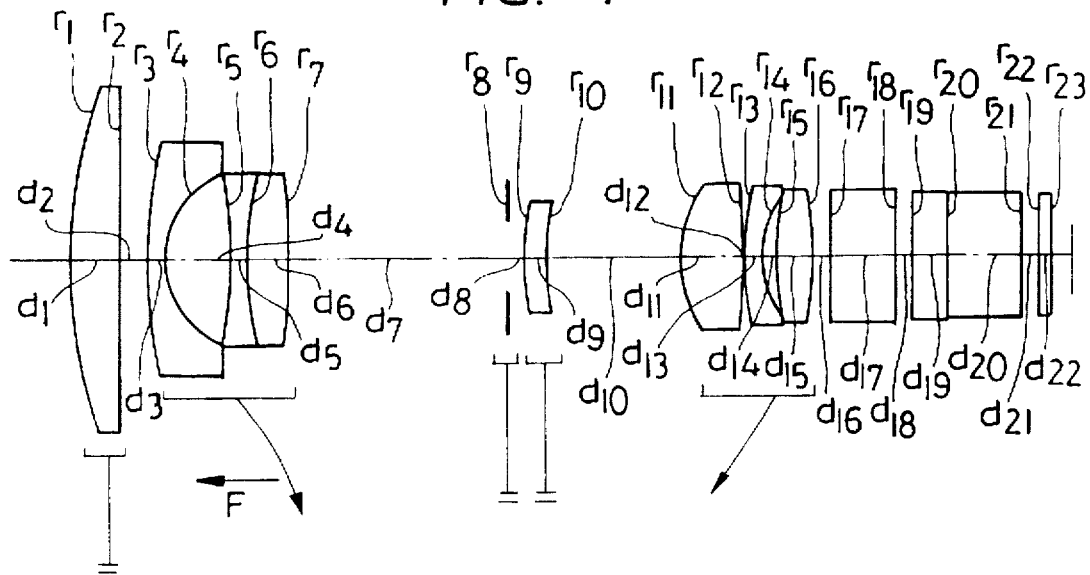

The fourth embodiment has a composition illustrated in FIG. 4 which is the same as that of the first embodiment, except for a third lens unit which is composed of a single positive lens element. Aspherical surfaces are used as an image side surface of the second lens unit and an object side surface of the fourth lens unit. In the fourth embodiment, the third lens unit is designed for $f_3 = 530.38$ or has a positive refractive power.

Figure 5:
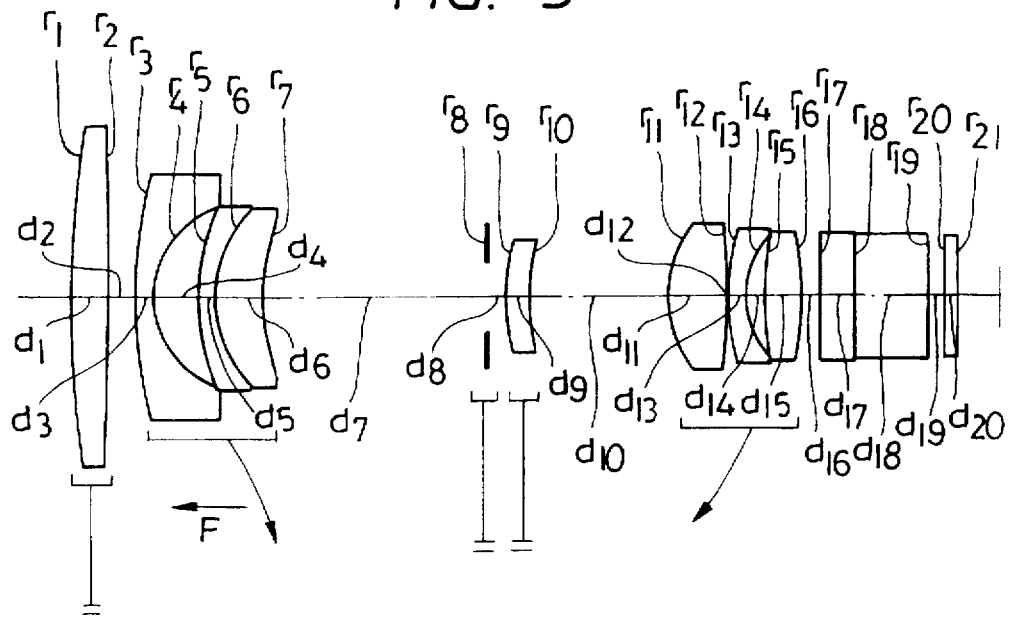

The fifth embodiment has a composition illustrated in FIG. 5 which is similar to that of the fourth embodiment. In the fifth embodiment, aspherical surfaces are disposed at locations corresponding to those of the aspherical surfaces used in the fourth embodiment. A third lens unit adopted for the fifth embodiment is designed with $f_3 = 84.27$ or has a positive refractive power.

Figure 6:
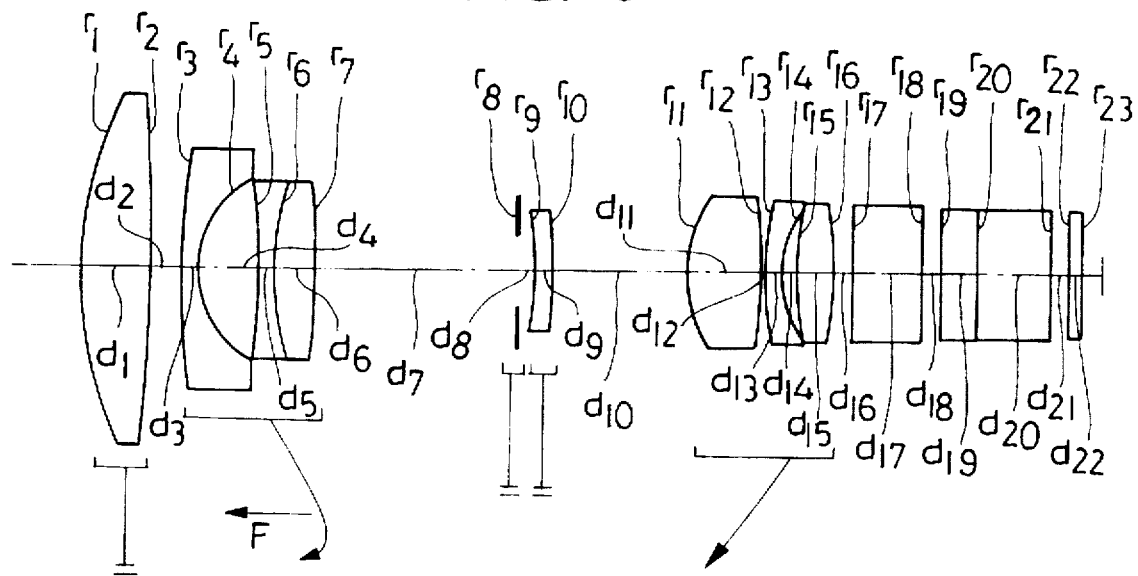

The sixth embodiment has a composition shown in FIG. 6 which is the same as that of the fourth or fifth embodiment, except for a third lens unit which has a concave surface on the object side. In the sixth embodiment, aspherical surfaces are adopted as an image side surface of a second lens unit and an object side surface of a fourth lens unit. In the sixth embodiment, the third lens unit is configured to have $f_3 = -100.00$ or a negative refractive power.

Figure 7:
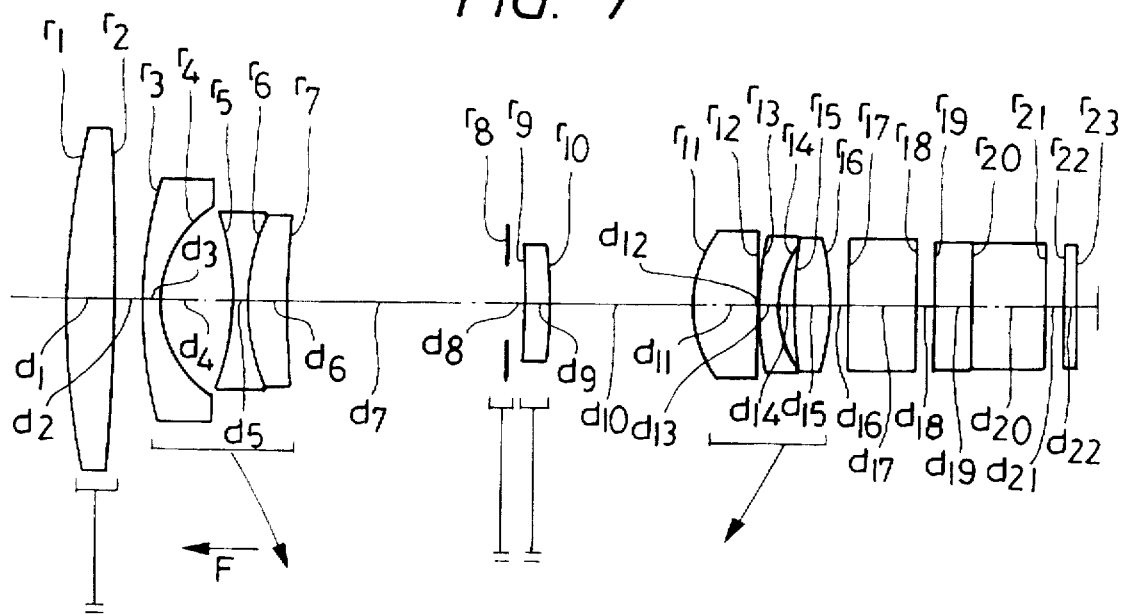

The seventh embodiment has a composition shown in FIG. 7 which is similar to that of the sixth embodiment, except for a third lens unit which is composed of a positive meniscus lens element having a concave surface on the object side. Aspherical surfaces are used as an image side surface of the third lens unit and an object side surface of a fourth lens unit. The seventh embodiment is designed with $f_3 = 103.33$ or the third lens unit has a positive refractive power.

Figure 8:
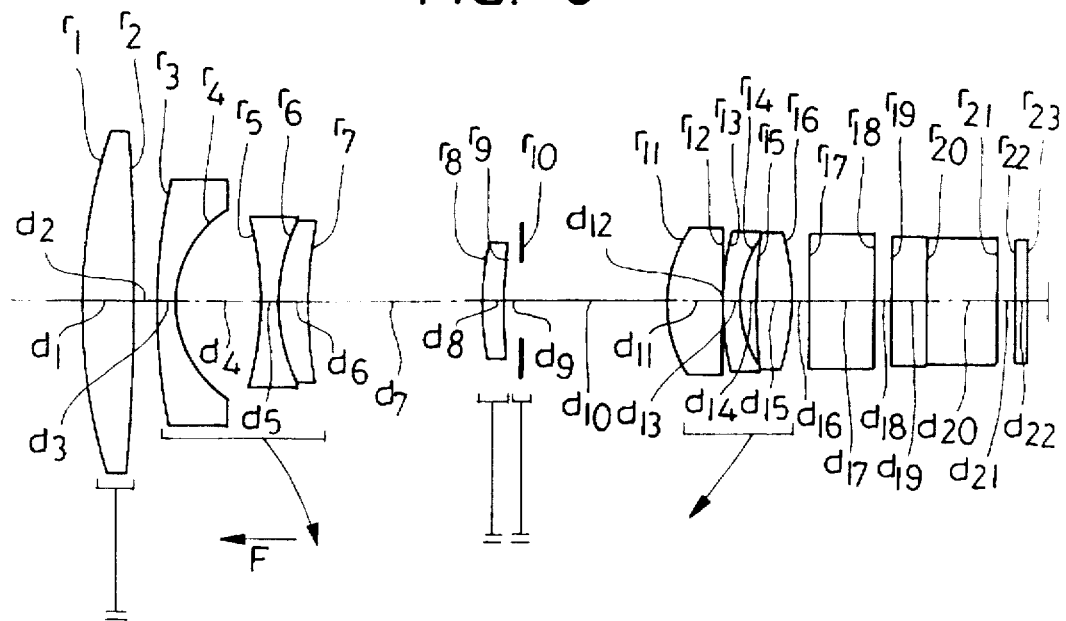

The eighth embodiment has a composition illustrated in FIG. 8 which is similar to that of the first, fifth, sixth or seventh embodiment. Differently from the first, fifth, sixth or seventh embodiment, however, the eighth embodiment uses a third lens unit which is composed of a positive meniscus lens element having a convex surface on the object side, and a stop which is disposed between the third lens unit and a fourth lens unit. The eighth embodiment uses an aspherical surface as an object side surface of the fourth lens unit. In this embodiment, the third lens unit $f_3 = 67.67$ or a positive refractive power.

Figure 9:
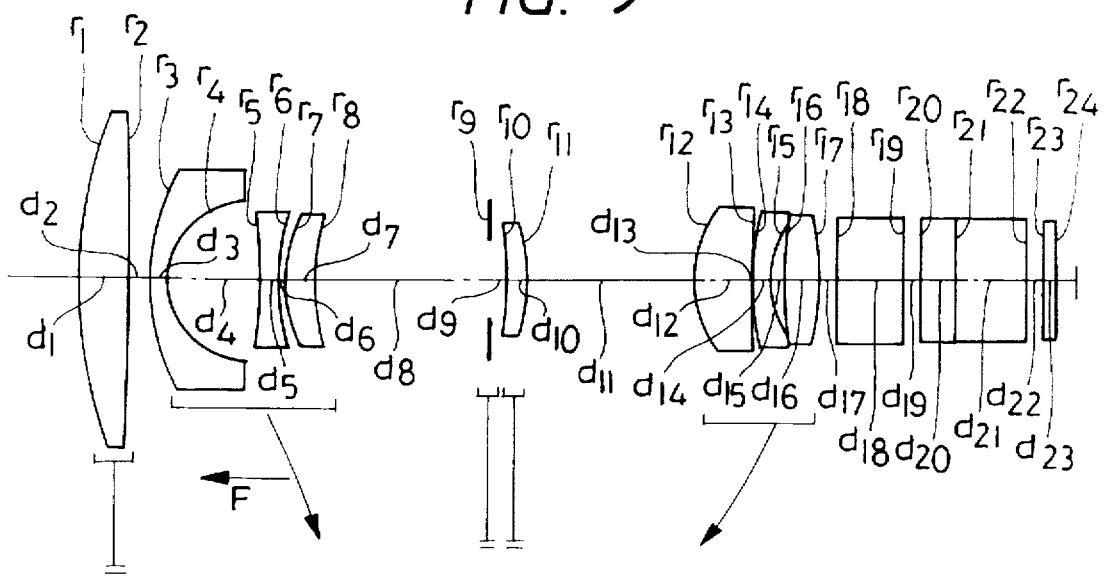

The ninth embodiment has a composition illustrated in FIG. 9 which is similar to that of the seventh embodiment. Differently from the seventh embodiment, however, the ninth embodiment uses a second lens unit which is composed of a negative meniscus lens element, a negative lens element and a positive lens element disposed with airspaces reserved therebetween. The ninth embodiment uses an aspherical surface as an object side surface of a fourth lens unit. In the ninth embodiment, a third lens unit is configured to have $f_3 = 33.87$ or a positive refractive power.

Figure 10:
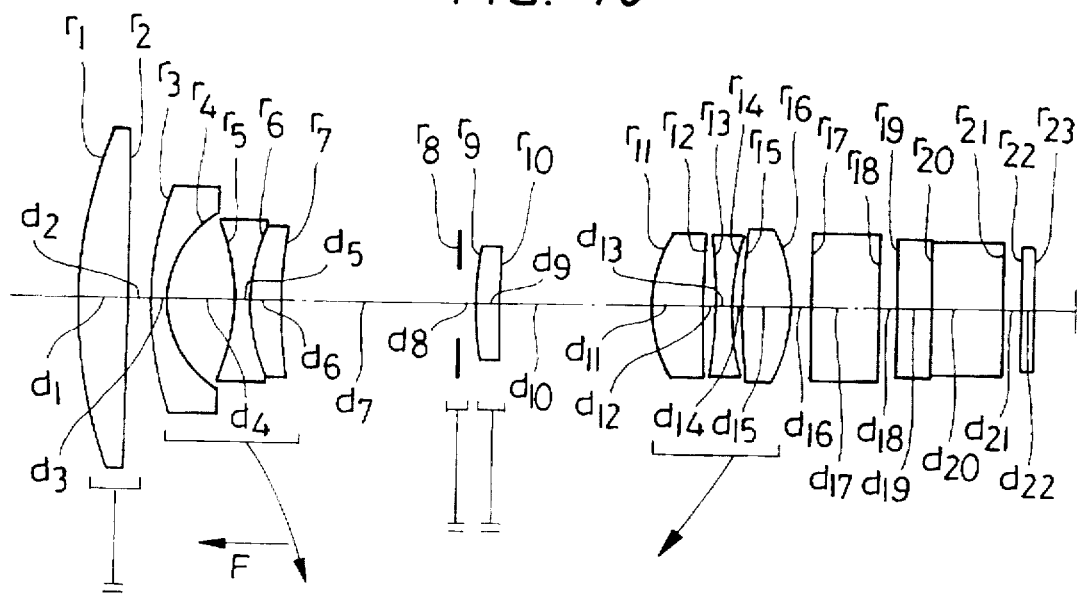

The tenth embodiment has a composition shown in FIG. 10 which is similar to that of the eighth embodiment, except for a fourth lens unit which is composed of a positive lens element, a negative (biconcave) lens element and a positive lens element, and a stop which is disposed between a second lens unit and a third lens unit. The tenth embodiment uses an aspherical surface as an object side surface of the positive lens element disposed on the image side in the fourth lens unit. In this embodiment, the third lens unit is configured to have $f_3 = 56.93$ or a positive refractive power.

Out of the embodiments of the present invention described above, each of the first, second and fourth through tenth embodiment uses a first lens unit which is composed of a single lens element for obtaining an advantage to reduce a price of the zoom lens system according to the present invention. Further, each of the third through tenth embodiments uses a third lens unit which is composed of a single lens element so as to be advantageous for reducing the price of the zoom lens system according to the present invention. Accordingly, each of the first lens unit and the third lens unit is composed of a single lens element in each of the third through tenth embodiments. Further, the sixth embodiment is configured as a zoom lens system which is much lower in its price and lighter in its weight in using the first lens unit and the third lens unit each of which is composed of a single plastic lens element.

The aspherical surfaces used in the embodiments described above have shapes expressed by the formula shown below:

$$x = \frac{y^2/r}{1+\sqrt{1-p(y/r)^2}} + A_4 y^4 + A_6 y^6 + A_8 y^8$$

wherein a direction along the optical axis is taken as the x axis, a direction perpendicular to the optical axis is taken as the y axis, the reference symbol p represents a conical constant, and the reference symbols $A_4$, $A_6$, . . . designate aspherical surface coefficients of the fourth, sixth, . . . orders respectively.

Variations of the airspaces $D_1$, $D_2$, $D_3$ and $D_4$ to be caused by changing magnifications of the embodiments and focusing the zoom lens systems are specified in the numerical data. The values mentioned in the numerical data represent the airspaces reserved in conditions where the zoom lens systems are focused on an object located at infinite distance (∞) at the wide position W, the standard position (intermediate focal length) S and the tele position T and in other conditions where the zoom lens systems are focused on an object located at a finite distance (for example, 500 mm) at the wide position W, the standard position S and the tele position T.

I claim:

1. A zoom lens system comprising, in order from the object side: a first lens unit having a positive refractive power; a second lens unit having a negative refractive power; a third lens unit (having a positive or negative refractive power); and a fourth lens unit having a positive refractive power, wherein a magnification of said zoom lens system is changed by moving said second lens unit along an optical axis and moving said fourth lens unit monotonously toward the object side along the optical axis from its location at a wide position to another location at a tele position, and wherein said zoom lens system satisfies the following conditions (1) and (2):

$$0 < f_4/f_1 < 0.45 \quad (1)$$

$$-1.6 < \beta_{4T} < -0.5 \quad (2)$$

wherein the reference symbol $f_1$ represents a focal length of said first lens unit, the reference symbol $f_4$ designates a focal length of the fourth lens unit and the reference symbol $\beta_{4T}$ denotes a magnification of the fourth lens unit at the tele position.

2. A zoom lens system according to claim 1, wherein said first lens unit and said third lens unit are kept stationary during the change of a magnification of said zoom lens system.

3. A zoom lens system according to claim 1 or 2, wherein said zoom lens system is focused by moving said second lens unit.

4. A zoom lens system according to claim 3, satisfying the following condition (3):

$$-0.6 < \beta_{2T} < 0 \quad (3)$$

wherein the reference symbol $\beta_{2T}$ represents a magnification of said second lens unit at the tele position.

5. A zoom lens system according to claim 1, or 2, further or 4 comprising a stop which is disposed between said second lens unit and said fourth lens unit, and fixed on the optical axis.

6. A zoom lens system according to claim 3, further comprising a stop which is disposed between said second lens unit and said fourth lens unit, and fixed on the optical axis.

7. A zoom lens system according to claim 1, or 2 satisfying the following condition (4):

$$1.2 \times (\beta_{2T}/\beta_{2W}) < \beta_{4T}/\beta_{4W} < 5.6 \times (\beta_{2T}/\beta_{2W}) \quad (4)$$

wherein the reference symbols $\beta_{2T}$ and $\beta_{2W}$ represent magnifications of said second lens unit at the tele position and the wide position respectively, and the reference symbols $\beta_{4T}$ and $\beta_{4W}$ designate magnifications of said fourth lens unit at the tele position and wide position respectively.

8. A zoom lens system according to claim 3, satisfying the following condition (4):

$$1.2 \times (\beta_{2T}/\beta_{2W}) < \beta_{4T}/\beta_{4W} < 5.6 \times (\beta_{2T}/\beta_{2W}) \quad (4)$$

wherein the reference symbols $\beta_{2T}$ and $\beta_{2W}$ represent magnifications of said second lens unit at the tele position and the wide position respectively, and the reference symbols $\beta_{4T}$ and $\beta_{4W}$ designate magnifications of said fourth lens unit at the tele position and wide position respectively.

9. A zoom lens system according to claim 5, satisfying the following condition (4):

$$1.2 \times (\beta_{2T}/\beta_{2W}) < \beta_{4T}/\beta_{4W} < 5.6 \times (\beta_{2T}/\beta_{2W}) \quad (4)$$

wherein the reference symbols $\beta_{2T}$ and $\beta_{2W}$ represent magnifications of said second lens unit at the tele position and the wide position respectively, and the reference symbols $\beta_{4T}$ and $\beta_{4W}$ designate magnifications of said fourth lens unit at the tele position and wide position respectively.

10. A zoom lens system according to claim 1, or 2 satisfying the following conditions (5), (6) and (7):

$$0 < f_W/f_1 < 0.2 \quad (5)$$

$$0.2 < f_W/f_4 < 0.7 \quad (6)$$

$$-0.2 < f_4/f_3 < 0.6 \quad (7)$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

11. A zoom lens system according to claim 3, satisfying the following conditions (5), (6) and (7):

$$0 < f_W/f_1 < 0.2 \quad (5)$$

$$0.2 < f_W/f_4 < 0.7 \quad (6)$$

$$-0.2 < f_4/f_3 < 0.6 \quad (7)$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

12. A zoom lens system according to claim 5, satisfying the following conditions (5), (6) and (7):

$$0 < f_W/f_1 < 0.2 \quad (5)$$

$$0.2 < f_W/f_4 < 0.7 \quad (6)$$

21

$$-0.2 < f_w/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

13. A zoom lens system according to claim 7, satisfying the following conditions (5), (6) and (7):

$$0 < f_w/f_1 < 0.2 \tag{5}$$

$$0.2 < f_w/f_4 < 0.7 \tag{6}$$

$$-0.2 < f_w/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

14. A zoom lens system according to claim 1 or 2, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

15. A zoom lens system according to claim 3, wherein said fourth lens unit is composed, in order from the object side, of a positive lens component, a negative meniscus lens component and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

16. A zoom lens system according to claim 5 wherein said fourth lens unit is composed, in order from the object side, of a positive lens component, a negative meniscus lens component and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

17. A zoom lens system according to claim 7, wherein said fourth lens unit is composed, in order from the object side, of a positive lens component, a negative meniscus lens component and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

22 wherein the reference symbols $r_{F1}$ and $r_{R1}$ represent radii of curvature on an object side surface and an image side surface respectively of said negative meniscus lens component.

18. A zoom lens system according to claim 10, wherein said fourth lens unit is composed, in order from the object side, of a positive lens component, a negative meniscus lens component and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

19. A zoom lens system according to claim 1, or 2 wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2} + r_{R2})/(r_{F2} - r_{R2}) < 0.9 \tag{9}$$

wherein the reference symbols $r_{F2}$ and $r_{R2}$ represent radii of curvature on an object side surface and an image side surface respectively of said biconcave lens component.

20. A zoom lens system according to claim 3, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2} + r_{R2})/(r_{F2} - r_{R2}) < 0.9 \tag{9}$$

wherein the reference symbols $r_{F2}$ and $r_{R2}$ represent radii of curvature on an object side surface and an image side surface respectively of said biconcave lens component.

21. A zoom lens system according to claim 5, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2} + r_{R2})/(r_{F2} - r_{R2}) < 0.9 \tag{9}$$

wherein the reference symbols $r_{F2}$ and $r_{R2}$ represent radii of curvature on an object side surface and an image side surface respectively of said biconcave lens component.

22. A zoom lens system according to claim 7, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2} + r_{R2})/(r_{F2} - r_{R2}) < 0.9 \tag{9}$$

wherein the reference symbols $r_{F2}$ and $r_{R2}$ represent radii of curvature on an object side surface and an image side surface respectively of said biconcave lens component.

23. A zoom lens system according to claim 10, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2} + r_{R2})/(r_{F2} - r_{R2}) < 0.9 \tag{9}$$

wherein the reference symbols $r_{F2}$ and $r_{R2}$ represent radii of curvature on an object side surface and an image side surface respectively of said biconcave lens component.

24. A zoom lens system according to claim 4, further comprising a stop which is disposed between said second lens unit and said fourth lens unit, and fixed on the optical axis.

25. A zoom lens system according to claim 4, satisfying the following condition (4):

$$1.2 \times (\beta_{2T}/\beta_{2W}) < \beta_{4T}/\beta_{4W} < 5.6 \times (\beta_{2T}/\beta_{2W}) \tag{4}$$

wherein the reference symbols $\beta_{2T}$ and $\beta_{2W}$ represent magnifications of said second lens unit at the tele position and the wide position respectively, and the reference symbol $\beta_{4T}$ and $\beta_{4W}$ designate magnifications of said fourth lens unit at the tele position and wide position respectively.

26. A zoom lens system according to claim 6, satisfying the following condition (4):

$$1.2 \times (\beta_{2T}/\beta_{2W}) < \beta_{4T}/\beta_{4W} < 5.6 \times (\beta_{2T}/\beta_{2W}) \tag{4}$$

wherein the reference symbols $\beta_{2T}$ and $\beta_{2W}$ represent magnifications of said second lens unit at the tele position and the wide position respectively, and the reference symbol $\beta_{4T}$ and $\beta_{4W}$ designate magnifications of said fourth lens unit at the tele position and wide position respectively.

27. A zoom lens system according to claim 4, satisfying the following conditions (5), (6) and (7):

$$0 < f_W/f_1 < 0.2 \tag{5}$$

$$0.2 < f_W/f_4 < 0.7 \tag{6}$$

$$-0.2 < f_4/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

28. A zoom lens system according to claim 6, satisfying the following conditions (5), (6) and (7):

$$0 < f_W/f_1 < 0.2 \tag{5}$$

$$0.2 < f_W/f_4 < 0.7 \tag{6}$$

$$-0.2 < f_4/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

29. A zoom lens system according to claim 8, satisfying the following conditions (5), (6) and (7):

$$0 < f_W/f_1 < 0.2 \tag{5}$$

$$0.2 < f_W/f_4 < 0.7 \tag{6}$$

$$-0.2 < f_4/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

30. A zoom lens system according to claim 9, satisfying the following conditions (5), (6) and (7):

$$0 < f_W/f_1 < 0.2 \tag{5}$$

$$0.2 < f_W/f_4 < 0.7 \tag{6}$$

$$-0.2 < f_4/f_3 < 0.6 \tag{7}$$

wherein the reference symbol $f_W$ represents a focal length of the zoom lens system as a whole at the wide position, and the reference symbols $f_1$, $f_3$ and $f_4$ designate focal lengths of said first lens unit, said third lens unit and said fourth lens unit respectively at the wide position.

31. A zoom lens system according to claim 4, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

32. A zoom lens system according to claim 6, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said meniscus lens component.

33. A zoom lens system according to claim 8, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

34. A zoom lens system according to claim 9, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1} + r_{R1})/(r_{F1} - r_{R1}) < 4.0 \tag{8}$$

wherein the reference symbols $r_{F1}$ and $r_{R1}$ represent radii of curvature on an object side surface and an image side surface respectively of said negative meniscus lens component.

35. A zoom lens system according to claim 11, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1}+r_{R1})/(r_{F1}-r_{R1}) < 4.0 \qquad (8)$$

wherein the reference symbols $r_{F1}$ and $r_{R1}$ represent radii of curvature on an object side surface and an image side surface respectively of said negative meniscus lens component.

36. A zoom lens system according to claim 12, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1}+r_{R1})/(r_{F1}-r_{R1}) < 4.0 \qquad (8)$$

wherein the reference symbols $r_{F1}$ and $r_{R1}$ represent radii of curvature on an object side surface and an image side surface respectively of said negative meniscus lens component.

37. A zoom lens system according to claim 13, wherein said fourth lens unit is composed, in order from the object side, of a positive lens component, a negative meniscus lens component having a convex surface on the object side and a positive lens component, wherein said positive lens component disposed on the object side has an aspherical surface, and wherein said negative meniscus lens component satisfies the following condition (8):

$$1.1 < (r_{F1}+r_{R1})/(r_{F1}-r_{R1}) < 4.0 \qquad (8)$$

wherein the reference symbols $r_{F1}$ and $r_{R1}$ represent radii of curvature on an object side surface and an image side surface respectively of said negative meniscus lens component.

38. A zoom lens system according to claim 4, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

39. A zoom lens system according to claim 6, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

40. A zoom lens system according to claim 8, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

41. A zoom lens system according to claim 9, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

42. A zoom lens system according to claim 11, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

43. A zoom lens system according to claim 12, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

44. A zoom lens system according to claim 13, wherein said fourth lens unit is composed, in order from the object side, of a positive lens component, a biconcave lens component and a positive lens component, wherein said positive lens component disposed on the image side has an aspherical surface, and wherein said biconcave lens component satisfies the following condition (9):

$$-0.9 < (r_{F2}+r_{R2})/(r_{F2}-r_{R2}) < 0.9 \qquad (9)$$

wherein the reference symbols $r_{F2}$ and $r_{R2}$ represent radii of curvature on an object side surface and an image side surface respectively of said biconcave lens component.

* * * * *